US012125452B2

(12) United States Patent
Jang et al.

(10) Patent No.: US 12,125,452 B2
(45) Date of Patent: Oct. 22, 2024

(54) DISPLAY DEVICE HAVING A LIGHT SPREAD REGION BETWEEN A HIGH AND LOW GRAY REGION AND A METHOD OF DRIVING THEREOF

(71) Applicant: SAMSUNG DISPLAY CO., LTD., Yongin-si (KR)

(72) Inventors: Dae-Gwang Jang, Yongin-si (KR); Byung Ki Chun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/220,954

(22) Filed: Jul. 12, 2023

(65) Prior Publication Data

US 2024/0105134 A1 Mar. 28, 2024

(30) Foreign Application Priority Data

Sep. 23, 2022 (KR) ........................ 10-2022-0120427

(51) Int. Cl.

| | |
|---|---|
| ***G09G 3/36*** | (2006.01) |
| ***G09G 3/20*** | (2006.01) |
| ***G09G 3/3291*** | (2016.01) |

(52) U.S. Cl.
CPC ......... *G09G 3/3607* (2013.01); *G09G 3/2003* (2013.01); *G09G 3/3291* (2013.01)

(58) Field of Classification Search
CPC .................................................... G09G 3/3607
USPC .......................................................... 345/690
See application file for complete search history.

(56) References Cited

U.S. PATENT DOCUMENTS

| | | | | |
|---|---|---|---|---|
| 10,686,246 B2 | 6/2020 | Park et al. | | |
| 2021/0134236 A1* | 5/2021 | Shiomi | ................ | G09G 3/3611 |
| 2022/0351695 A1* | 11/2022 | Tong | .................... | G09G 3/3607 |

FOREIGN PATENT DOCUMENTS

| | | |
|---|---|---|
| KR | 10-1186548 | 10/2012 |

* cited by examiner

*Primary Examiner* — Long D Pham
(74) *Attorney, Agent, or Firm* — F. CHAU & ASSOCIATES, LLC

(57) ABSTRACT

A display device including: a display panel including pixels; a controller configured to receive input image data, to detect a high gray region adjacent to a low gray region in an image represented by the input image data, to set at least a portion of the low gray region adjacent to the high gray region as a light spread region based on a light spread distance or a pixel density of the display panel, and to generate output image data by correcting the input image data for the light spread region; and a data driver configured to provide data voltages to the pixels based on the output image data.

19 Claims, 20 Drawing Sheets

DISPLAY DEVICE HAVING A LIGHT SPREAD REGION BETWEEN A HIGH AND LOW GRAY REGION AND A METHOD OF DRIVING THEREOF

CROSS-REFERENCE TO RELATED APPLICATION(S)

This application claims priority under 35 U.S.C. § 119 to Korean Patent Application No. 10-2022-0120427, filed on Sep. 23, 2022 in the Korean Intellectual Property Office (KIPO), the disclosure of which is incorporated by reference herein in its entirety.

1. TECHNICAL FIELD

Embodiments of the present inventive concept relate to a display device, and more particularly to a display driver, a display device and a method of operating the display device capable of preventing light stress.

2. DESCRIPTION OF THE RELATED ART

Each pixel of a display device typically has a driving transistor that generates a driving current based on a data voltage, and a light emitting element that produces light based on the driving current. In the display device, it is important that pixels emit light with substantially the same luminance at the same gray level.

However, a driving transistor of a pixel displaying a 0-gray level or a low gray level may be degraded by light emitted from an adjacent pixel, or due to light stress. This can result in a shift in a threshold voltage of the driving transistor. If the driving transistors of the pixels in a display device become compromised by light stress, the pixels may emit light with varying brightness levels at the same gray level. Further, if the driving transistors are implemented with oxide transistors, the shift in the threshold voltage due to light stress may become exacerbated.

SUMMARY

Some embodiments of the present inventive concept provide a display device capable of preventing light stress.

Some embodiments of the present inventive concept provide a method of operating a display device capable of preventing light stress.

Some embodiments of the present inventive concept provide a display driver capable of preventing light stress.

According to embodiments of the present inventive concept, there is provided a display device including: a display panel including pixels; a controller configured to receive input image data, to detect a high gray region adjacent to a low gray region in an image represented by the input image data, to set at least a portion of the low gray region adjacent to the high gray region as a light spread region based on a light spread distance or a pixel density of the display panel, and to generate output image data by correcting the input image data for the light spread region; and a data driver configured to provide data voltages to the pixels based on the output image data.

The image in the low gray region has a gray level lower than or equal to a first reference gray level, and the image in the high gray region has a gray level greater than or equal to a second reference gray level.

The controller sets the light spread region such that a number of the pixels included in the light spread region along a width direction of the light spread region corresponds to a product of the light spread distance and the pixel density.

The controller generates the output image data by increasing the input image data for the light spread region.

The pixels in the light spread region emit light to prevent stress caused by light emitted by the high gray region.

The controller includes: a high gray region detecting circuit configured to detect the high gray region adjacent to the low gray region in the image represented by the input image data; a light spread region setting circuit configured to set at least the portion of the low gray region adjacent to the high gray region as the light spread region based on the light spread distance and the pixel density of the display panel; and a light spread region correcting circuit configured to correct the input image data for the light spread region.

The high gray region detecting circuit detects the high gray region adjacent to the low gray region by detecting an edge between the low gray region and the high gray region.

The light spread region setting circuit receives light spread distance information on the light spread distance of the display panel and pixel density information on the pixel density of the display panel, determines a number of the pixels by multiplying the light spread distance provided in the light spread distance information and the pixel density provided in the pixel density information, and sets the light spread region such that the light spread region includes the number of the pixels along a width direction of the light spread region.

The light spread region setting circuit further receives high gray region width information indicating a width of the high gray region, and increases a width of the light spread region as the width of the high gray region increases.

The light spread region correcting circuit determines correction values that gradually decrease along a direction away from the high gray region, and generates the output image data by adding the correction values to the input image data for the pixels in the light spread region.

The correction values non-linearly decrease with respect to a distance from the high gray region such that the correction values decrease rapidly in a region close to the high gray region and decrease slowly in a region far from the high gray region.

The correction values linearly decrease with respect to a distance from the high gray region.

The controller further includes an additional correction circuit configured to additionally correct the input image data for the light spread region adjacent to two or more high gray regions.

When a first high gray region and a second high gray region adjacent to the light spread region are detected, the light spread region correcting circuit determines a first correction value for preventing light stress caused by the first high gray region and a second correction value for preventing light stress caused by the second high gray region with respect to each of the pixels included in the light spread region, and the additional correction circuit generates the output image data by adding a higher one of the first correction value and the second correction value to the input image data with respect to each of the pixels included in the light spread region.

When a first high gray region and a second high gray region adjacent to the light spread region are detected, the light spread region correcting circuit determines a first correction value for preventing light stress caused by the first high gray region and a second correction value for preventing light stress caused by the second high gray region with respect to each of the pixels included in the light spread region, and the additional correction circuit generates the output image data by adding a sum of the first correction value and the second correction value to the input image data with respect to each of the pixels included in the light spread region.

According to embodiments of the present inventive concept, there is provided a method of operating a display device, the method including: detecting a high gray region adjacent to a low gray region in an image represented by input image data; setting at least a portion of the low gray region adjacent to the high gray region as a light spread region based on a light spread distance or a pixel density of a display panel of the display device; generating output image data by correcting the input image data for the light spread region; and driving the display panel based on the output image data.

A number of the pixels included in the light spread region along a width direction of the light spread region corresponds to a product of the light spread distance and the pixel density.

A width of the light spread region increases as a width of the high gray region increases.

Generating the output image data includes: determining correction values that decrease along a direction away from the high gray region; and generating the output image data by adding the correction values to the input image data for the pixels in the light spread region.

The method further includes additionally correcting the input image data for the light spread region adjacent to two or more high gray regions.

According to embodiments of the present inventive concept, there is provided a display driver that drives a display panel, the display driver including: a controller configured to receive input image data for the display panel, to detect a high gray region adjacent to a low gray region in an image represented by the input image data, to set a portion of the low gray region adjacent to the high gray region as a light spread region based on a light spread distance or a pixel density of the display panel, and to generate output image data by correcting the input image data for the light spread region; and a data driver configured to provide data voltages to pixels of the display panel based on the output image data.

In a display driver, a display device and a method of operating the display device according to embodiments of the present inventive concept, a high gray region adjacent to a low gray region may be detected, at least a portion of the low gray region may be set as a light spread region based on a light spread distance and a pixel density of a display panel, and image data for the light spread region may be corrected. Accordingly, light stress to pixels in the light spread region caused by light emitted by the high gray region may be prevented.

BRIEF DESCRIPTION OF THE DRAWINGS

Illustrative, non-limiting embodiments of the present inventive concept will be more clearly understood from the following detailed description in conjunction with the accompanying drawings.

DETAILED DESCRIPTION OF THE EMBODIMENTS

Figure 1:
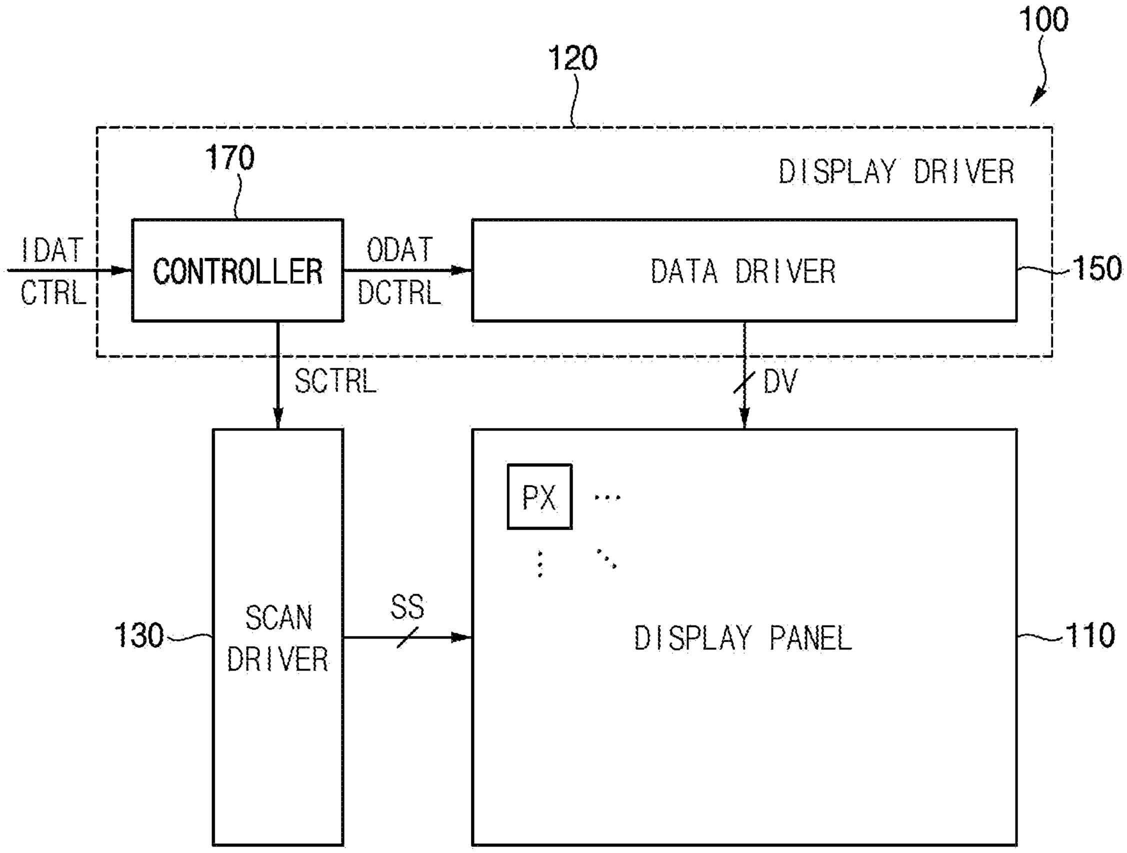
FIG. 1 is a block diagram illustrating a display device according to embodiments.

The embodiments of the present inventive concept are described more fully hereinafter with reference to the accompanying drawings. Like or similar reference numerals refer to like or similar elements throughout.

Figure 2:
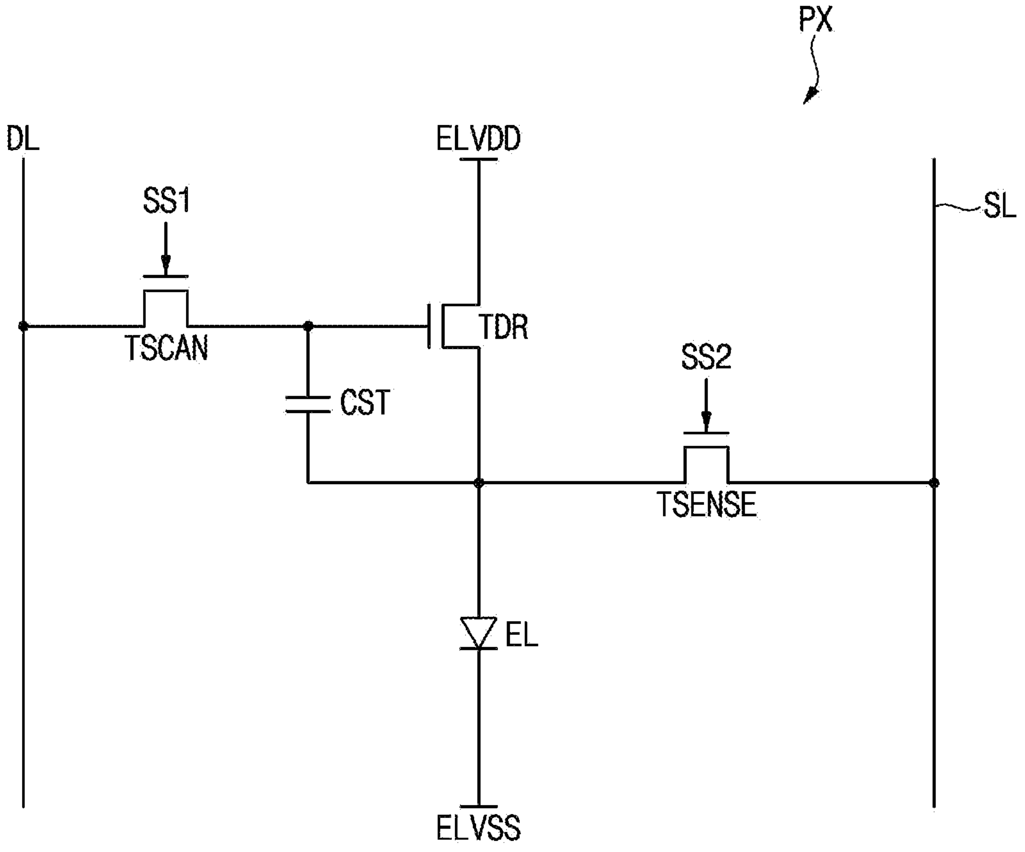
FIG. 2 is a circuit diagram illustrating an example of a pixel included in a display device according to embodiments.
Figure 3:
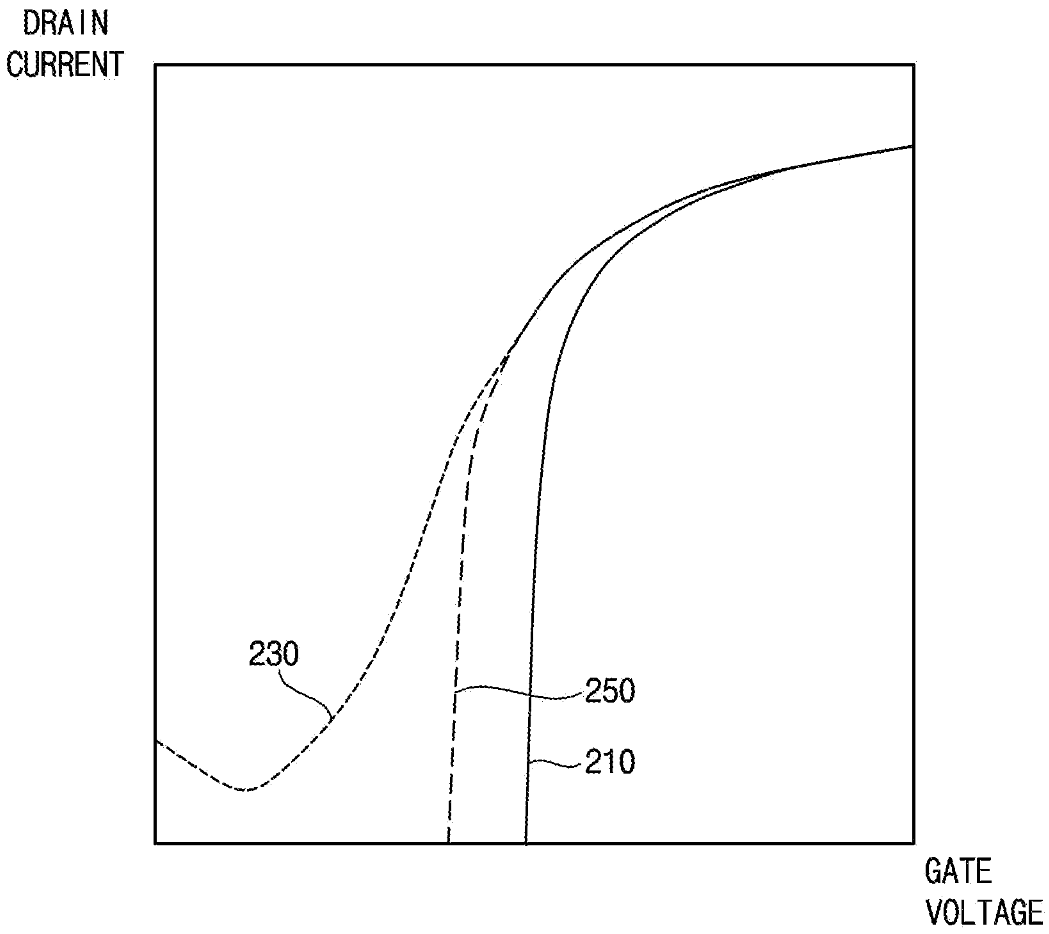
FIG. 3 is a diagram illustrating an example of voltage-current characteristics of a transistor included in a pixel before and after light is irradiated to the pixel.
Figure 4A:
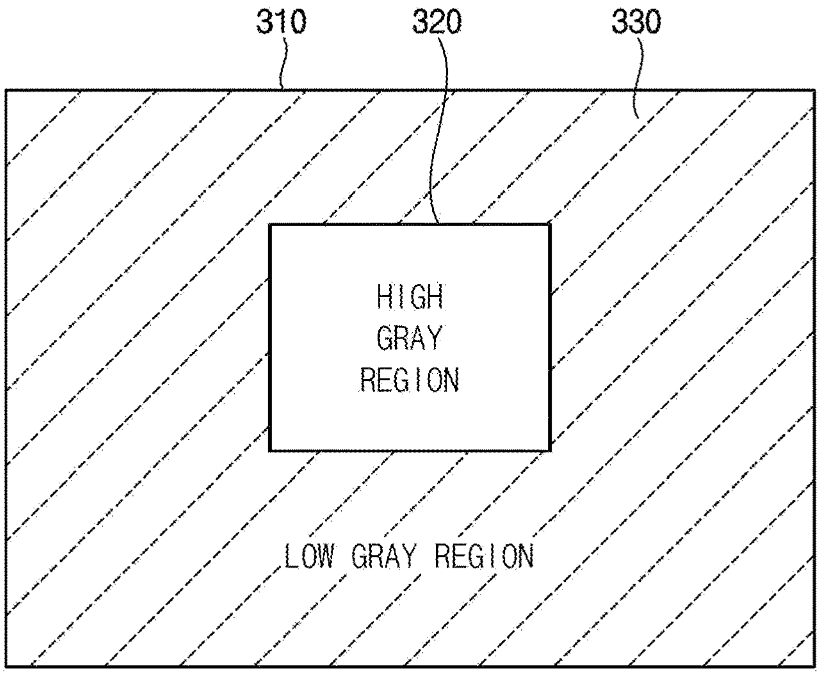
FIG. 4A is a diagram illustrating an example of a test image.
Figure 4B:
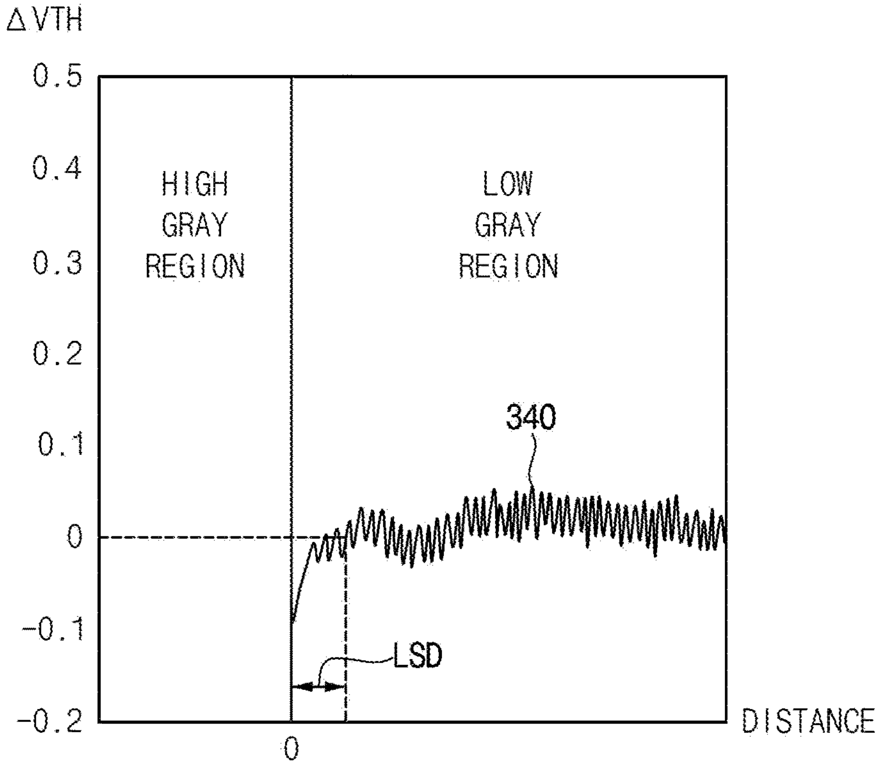
FIG. 4B is a diagram illustrating threshold voltage changes of driving transistors of pixels in a low gray region after the test image is displayed.
Figure 4C:
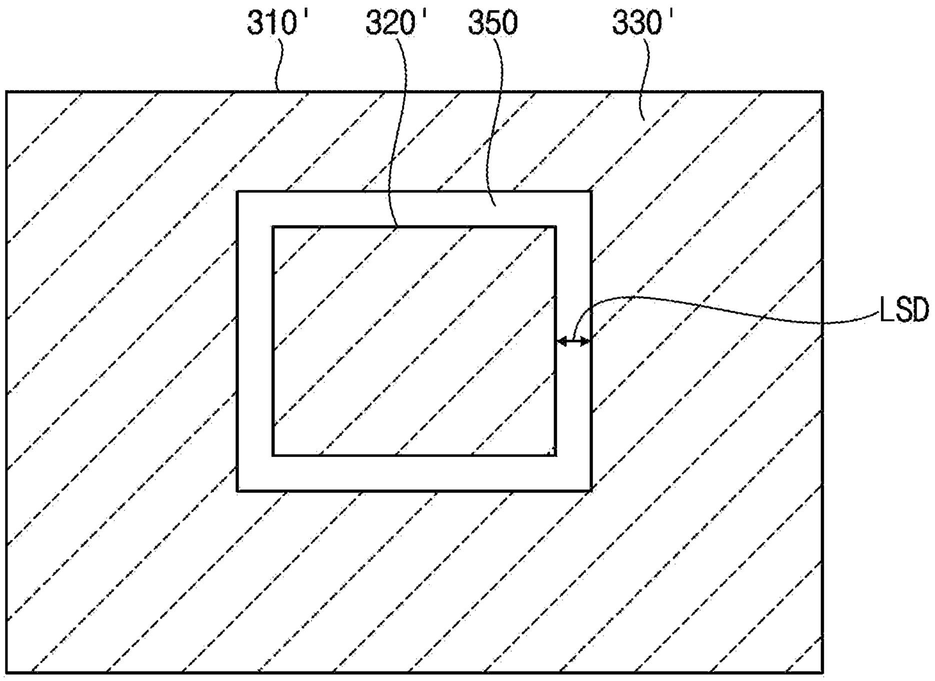
FIG. 4C is a diagram illustrating an example of an image displayed based on image data representing the same gray level after the test image is displayed.
Figure 5:
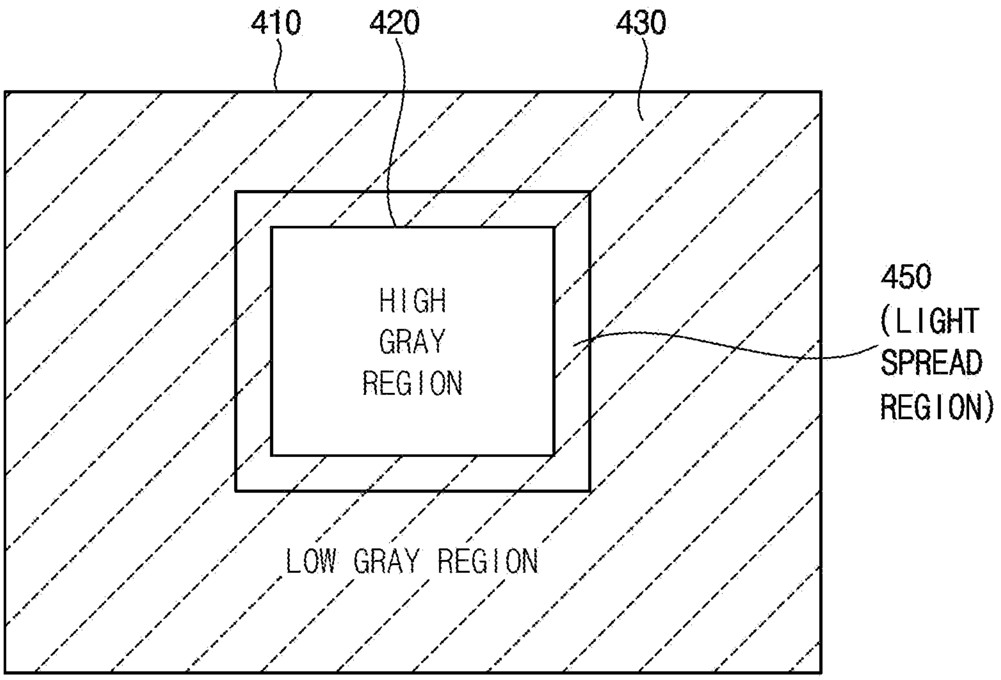
FIG. 5 is a diagram for describing an example where a display device according to embodiments sets a light spread region.

FIG. 1 is a block diagram illustrating a display device according to embodiments, FIG. 2 is a circuit diagram illustrating an example of a pixel included in a display device according to embodiments, FIG. 3 is a diagram illustrating an example of voltage-current characteristics of a transistor included in a pixel before and after light is irradiated to the pixel, FIG. 4A is a diagram illustrating an example of a test image, FIG. 4B is a diagram illustrating threshold voltage changes of driving transistors of pixels in a low gray region after the test image is displayed, FIG. 4C is a diagram illustrating an example of an image displayed based on image data representing the same gray level after the test image is displayed, and FIG. 5 is a diagram for describing an example where a display device according to embodiments sets a light spread region.

Referring to FIG. 1, a display device 100 according to embodiments may include a display panel 110 including pixels PX and a display driver 120 that drives the display panel 110. In some embodiments, the display device 100 may further include a scan driver 130 that provides scan signals SS to the pixels PX. The scan driver 130 may also be referred to as a gate driver. In some embodiments, the display driver 120 may include a data driver 150 that provides data voltages DV to the pixels PX, and a controller 170 that controls the scan driver 130 and the data driver 150.

The display panel 110 may include scan lines, data lines, and the pixels PX coupled to the scan lines and the data lines. In some embodiments, the display panel 110 may further include sensing lines coupled to the pixels PX. In some embodiments, each pixel PX may include a light emitting element, and the display panel 110 may be a light emitting display panel. However, the display panel 110 is not limited to the light emitting display panel, and may be any suitable display panel.

For example, as illustrated in FIG. 2, each pixel PX may include a scan transistor TSCAN that couples a data line DL to a gate node in response to a first scan signal SS1, a sensing transistor TSENSE that couples a sensing line SL to a source node in response to a second scan signal SS2, a storage capacitor CST coupled between the gate node and the source node, a driving transistor TDR including a gate coupled to the gate node, a source coupled to the source node and a drain receiving a first power supply voltage ELVDD, and a light emitting element EL including an anode coupled to the source node and a cathode receiving a second power supply voltage ELVSS. In some embodiments, the light emitting element EL may be an organic light emitting diode (OLED), but is not limited thereto. For example, the light emitting device EL may be a nano light emitting diode (NED), a quantum dot (QD) light emitting diode, a micro light emitting diode, an inorganic light emitting diode, or any other suitable light emitting element. Further, in some embodiments, at least one of the scan transistor TSCAN, the sensing transistor TSENSE and the driving transistor TDR may be implemented as an oxide transistor, but they are not limited thereto. Although FIG. 2 illustrates an example in which each pixel PX has a 3T1C structure including three transistors TSCAN, TSENSE and TDR and one capacitor CST, each pixel PX of the display device 100 according to embodiments is not limited to the 3T1C structure illustrated in FIG. 2, and may have any pixel structure. It is to be further understood that the gate node may be connected between the scan transistor TSCAN, the driving transistor TDR and the storage capacitor CST. In addition, the source node may be connected between the driving transistor TDR, the storage capacitor CST, the light emitting device EL and the sensing transistor TSENSE.

The scan driver 130 may generate the scan signals SS based on a scan control signal SCTRL received from the controller 170, and may sequentially provide the scan signals SS to the pixels PX through the scan lines on a row-by-row basis. In some embodiments, the scan control signal SCTRL may include, but is not limited to, a scan start signal and a scan clock signal. In some embodiments, the scan driver 130 may be integrated or formed on the display panel 110. In other embodiments, the scan driver 130 may be implemented in the form of an integrated circuit. In still other embodiments, the scan driver 130 may be included in the display driver 120.

The data driver 150 may generate the data voltages DV based on output image data ODAT and a data control signal DCTRL received from the controller 170, and may provide the data voltages DV to the pixels PX through the data lines. In some embodiments, the data control signal DCTRL may include a horizontal start signal, an output data enable signal and a load signal, but is not limited thereto. In some embodiments, the display driver 120 including the data driver 150 and the controller 170 may be implemented as a single integrated circuit, which may be referred to as a timing controller embedded data driver (TED) integrated circuit. In other embodiments, the data driver 150 and the controller 170 may be implemented as separate integrated circuits.

The controller 170 (e.g., a timing controller (TCON)) may receive input image data IDAT and a control signal CTRL from an external host processor (e.g., an application processor (AP), a graphics processing unit (GPU), a graphics card, etc.). In some embodiments, the input image data IDAT may be RGB image data including red image data, green image data and blue image data, but is not limited thereto. Further, in some embodiments, the control signal CTRL may include, but is not limited to, a vertical synchronization signal, a horizontal synchronization signal, an input data enable signal and a master clock signal. The controller 170 may control an operation of the scan driver 130 by providing the scan control signal SCTRL to the scan driver 130, and may control an operation of the data driver 150 by providing the output image data ODAT and the data control signal DCTRL to the data driver 150.

A voltage-current characteristic of a transistor (e.g., the driving transistor TDR) included in a non-emitting pixel PX (or a pixel PX displaying a low gray level) may be degraded (or light-degraded) by light (or light stress). FIG. 3 illustrates a first voltage-current characteristic 210 of a transistor (e.g., the driving transistor TDR) of a pixel PX before light is irradiated to the pixel PX, a second voltage-current characteristic 230 of the transistor of the pixel PX while the light is irradiated to the pixel PX, and a third voltage-current characteristic 250 of the transistor of the pixel PX after the light is irradiated to the pixel PX. In FIG. 3, the vertical axis corresponds to a drain current and the horizontal axis corresponds to a gate voltage. For example, as illustrated in FIG. 3, if the light is irradiated to each pixel PX for a predetermined period of time, a voltage-current characteristic of the driving transistor TDR of the pixel PX may be changed or degraded from the first voltage-current characteristic 210 to the third voltage-current characteristic 250, and a threshold voltage of the driving transistor TDR may be negatively shifted. In particular, when the driving transistor TDR is constructed using an oxide transistor, the light degradation of the driving transistor TDR can become more severe, leading to an increased negative shift in the threshold voltage of the driving transistor TDR.

Due to the light degradation of the driving transistor TDR, the driving transistor TDR of the non-emitting pixel PX (or the pixel PX displaying the low gray level) may be degraded (or light-degraded) by light (or light stress) of an adjacent emitting pixel PX. FIG. 4A illustrates an example of a test image 310 including a high gray image (e.g., a 255-gray level image) in a high gray region 320 and a low gray image (e.g., a 0-gray level image) in a low gray region 330, FIG. 4B illustrates a threshold voltage change ΔVTH and 340 of the driving transistors TDR of the pixels PX in the low gray region 330 after the display panel 110 displays the test image 310 for a predetermined period of time, and FIG. 4C illustrates an example of an image 310' displayed by the display panel 110 based on image data representing the same gray level after the display panel 110 displays the test image 310 for the predetermined period of time. For example, when the display panel 110 displays the test image 310 illustrated in FIG. 4A for the predetermined period of time, as illustrated in FIG. 4B, the driving transistors TDR of the pixels PX within a light spread distance LSD from the high gray region 320 among the pixels PX in the low gray region 330 may be degraded by stress (or light stress) by light emitted from the high gray region 320. As a consequence, the threshold voltages of the driving transistors TDR of the pixels PX within the light spread distance LSD from the high gray region 320 may be negatively shifted. Accordingly, after the display panel 110 displays the test image 310 for the predetermined period of time, even if the input image data IDAT represent the same gray level, the display panel 110 may not display the image 310' with uniform luminance (e.g., consistent brightness). In other words, a portion 350 of the low gray region 330' adjacent to the high gray region 320', or a region 350 within the light spread distance LSD from the high gray region 320' may have relatively high luminance compared with luminance of the remaining regions of the image 310'. As a result, a halo effect may occur in which the region 350 surrounding the high gray region 320' has high luminance (or appears bright).

To prevent or reduce the light stress to the non-emitting pixel PX (or the pixel PX displaying the low gray level) by the adjacent emitting pixel PX, as illustrated in FIG. 5, the controller 170 of the display device 100 in some embodiments can detect a high gray region 420 next to a low gray region 430 in an image 410 represented by the input image data IDAT. The controller 170 can then set (or designate) at least part of the low gray region 430 adjacent to the high gray region 420 as a light spread region 450 based on a light spread distance LSD and a pixel density of the display panel 110.

In some embodiments, the low gray region 430 may be a region displaying an image having a gray level lower than or equal to a first reference gray level, the high gray region 420 may be a region displaying an image having a gray level higher than or equal to a second reference gray level. The controller 170 can detect the high gray region 420 higher than or equal to the second reference gray level which is adjacent to the low gray region 430 lower than or equal to the first reference gray level. For example, the first reference gray level may be, but is not limited to, a 4-gray level, and the second reference gray level may be, but is not limited to, a 120-gray level.

Further, in some embodiments, the controller 170 may set the light spread region 450 such that the number of the pixels PX included in the light spread region 450 along a width direction of the light spread region 450 corresponds to a product of the light spread distance LSD and the pixel density. Here, the width direction of the light spread region 450 may be a direction substantially perpendicular to the high gray region 420. For example, as the light spread distance LSD of the display panel 110 increases, the number of the pixels PX included in the light spread region 450 may increase. Further, as the pixel density of the display panel 110 increases, the number of the pixels PX included in the light spread region 450 may increase. In some embodiments, the light spread distance LSD of the display panel 110 may be determined for each model or lot of the display panel 110. For example, after the display panel 110 displays the test image 310 illustrated in FIG. 4A for the predetermined period of time, the light spread distance LSD may be measured in the image 310' displayed by the display panel 110 based on the image data representing the same gray level as illustrated in FIG. 4C, and the light spread distance LSD of display panels having the same model as the display panel 110 may be determined as the light spread distance LSD measured in the image 310'. In other words, display panels of the same model may have the same light spread distance LSD measured during a test or manufacturing process. Further, the pixel density of the display panel 110 may indicate the number of the pixels PX within a unit distance. For example, the pixel density of the display panel 110 may be pixels per inch (PPI), but is not limited thereto.

Further, the controller 170 may generate the output image data ODAT by correcting the input image data IDAT for the light spread region 450. In some embodiments, the controller 170 may generate the output image data ODAT by increasing the input image data IDAT for the light spread region 450. The pixels PX of the display panel 110 may display an image having gray levels indicated by the output image data ODAT. Accordingly, the pixels PX in the light spread region 450 may emit light based on the output image data ODAT representing increased gray levels. This way, the driving transistors TDR of the pixels PX in the light spread region 450 will not be affected by the light emitted from the high gray region 420. Thus, in the display device 100 according to embodiments, even if the display panel 110 displays the image 410 including the low gray region 430 and the high gray region 420 close to each other, the pixels PX in the light spread region 450 may emit light to counteract stress caused by the light emitted by the high gray region 420. As a result, the driving transistors TDR of the pixels PX in the light spread region 450 will not be degraded (e.g., light-degraded).

As described above, in the display device 100 according to embodiments, the high gray region 420 adjacent to the low gray region 430 may be detected, at least a portion of the low gray region 430 may be designated as the light spread region 450 based on the light spread distance LSD and the pixel density of the display panel 110, and the input image data IDAT for the light spread region 450 may be corrected. Accordingly, the light stress to the pixels PX in the light spread region 450 caused by the light emitted by the high gray region 420 may be prevented, and the driving transistors TDR of the pixels PX in the light spread region 450 not be degraded (e.g., light-degraded).

Figure 6:
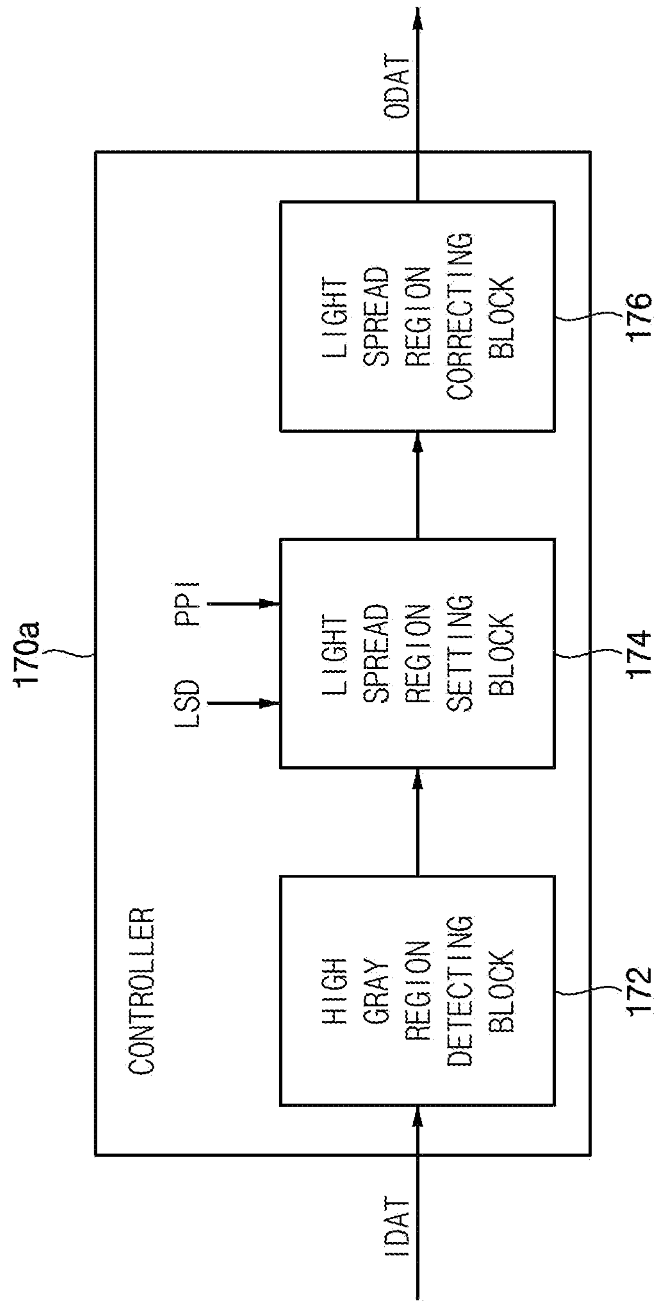
FIG. 6 is a block diagram illustrating a controller included in a display device according to embodiments.

FIG. 6 is a block diagram illustrating a controller included in a display device according to embodiments.

Referring to FIG. 6, a controller 170*a* included in a display device according to embodiments may include a high gray region detecting block 172, a light spread region setting block 174 and a light spread region correcting block 176. Each of these components may be implemented in hardware as an electronic circuit.

The high gray region detecting block 172 may detect a high gray region adjacent to a low gray region in an image represented by input image data IDAT. In some embodiments, the high gray region detecting block 172 may detect the high gray region adjacent to the low gray region by detecting an edge between the low gray region and the high gray region.

The light spread region setting block 174 may set at least a portion of the low gray region adjacent to the high gray region as the light spread region based on a light spread distance LSD and a pixel density PPI of a display panel. In some embodiments, the light spread region setting block 174 can receive light spread distance information on the light spread distance LSD of the display panel and pixel density information on the pixel density PPI of the display panel. The light spread region setting block 174 can then calculate the number of the pixels by multiplying the light spread distance LSD specified by the light spread distance information and the pixel density PPI specified by the pixel density information, and set the light spread region such that it encompasses the calculated number of pixels along a width direction of the light spread region.

The light spread region correcting block 176 may generate output image data ODAT by correcting the input image data IDAT for the light spread region. In some embodiments, the light spread region correcting block 176 may determine correction values that gradually decrease along a direction away from the high gray region, and may generate the output image data ODAT by adding the correction values to the input image data IDAT for the pixels in the light spread region.

Figure 7:
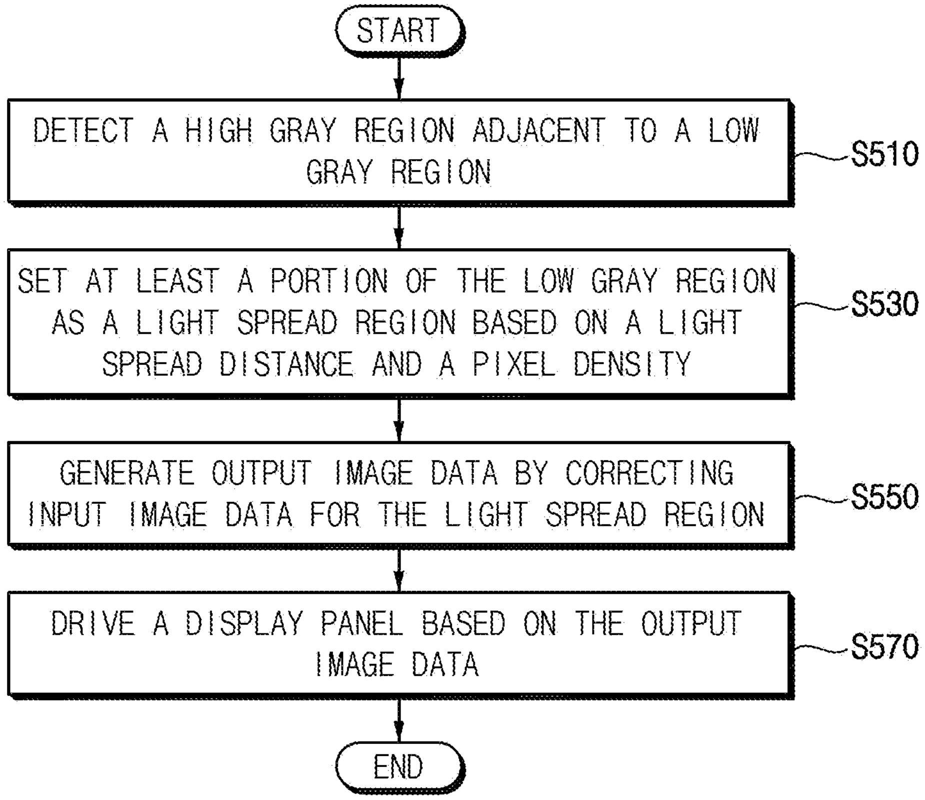
FIG. 7 is a flowchart illustrating a method of operating a display device according to embodiments.
Figure 8:
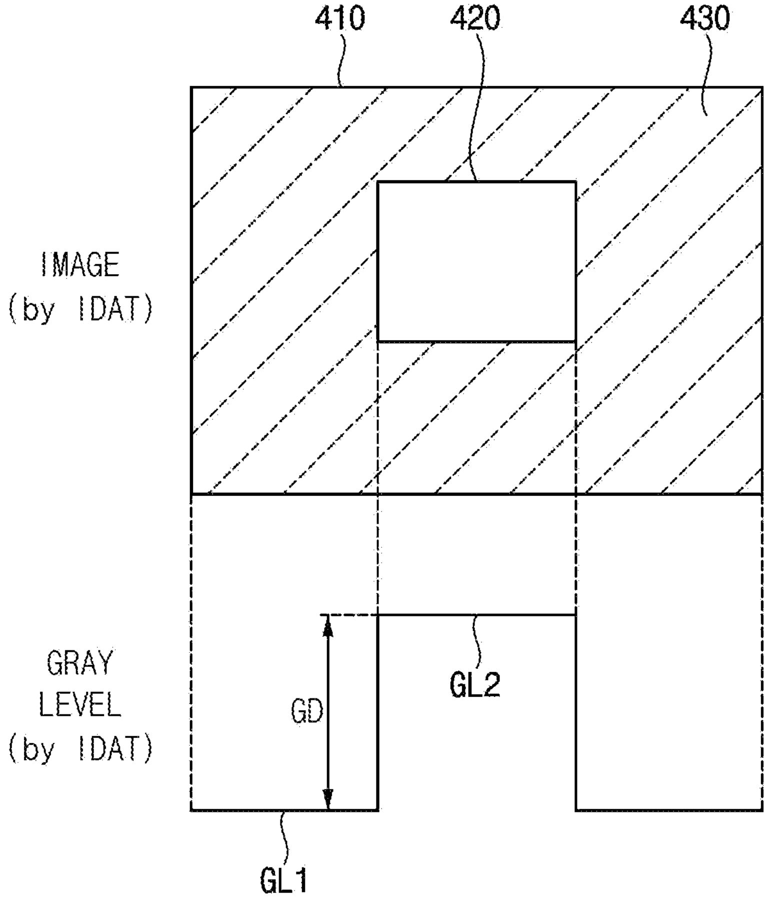
FIG. 8 is a diagram for describing an example where a high gray region is detected.
Figure 9:
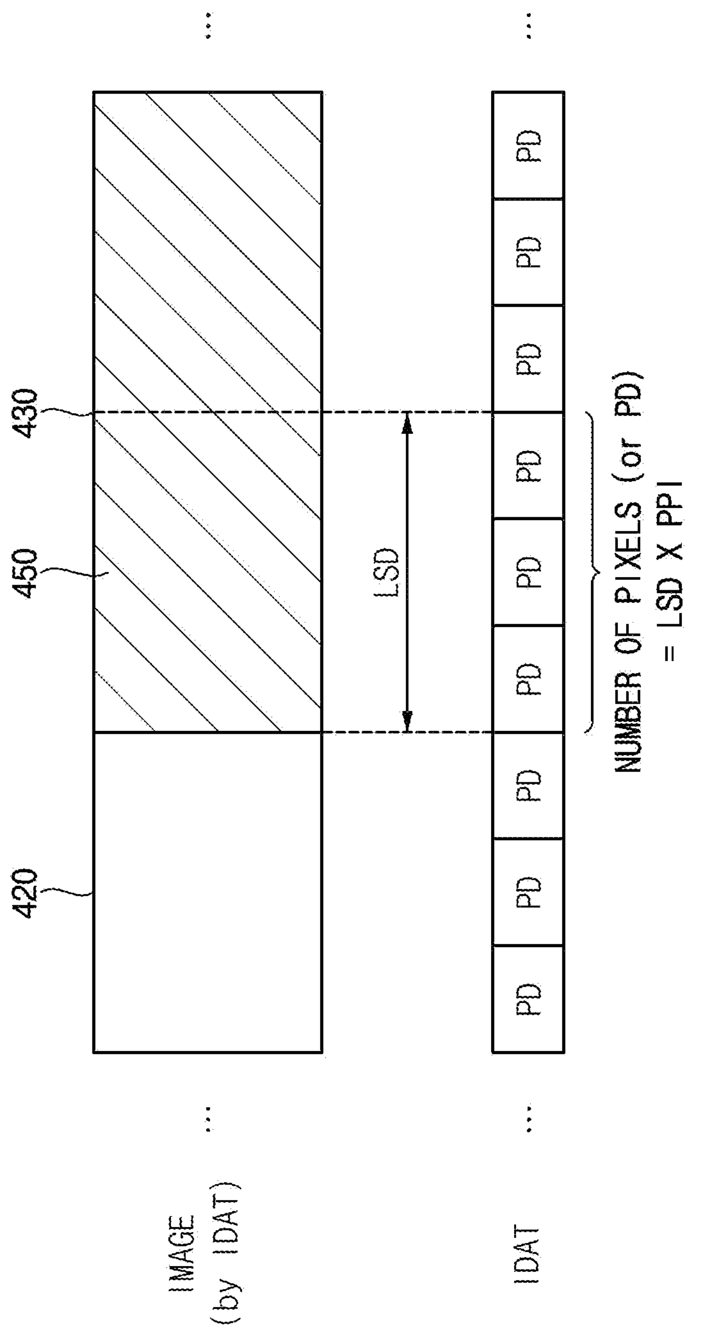
FIG. 9 is a diagram for describing an example where a light spread region is set.
Figure 10:
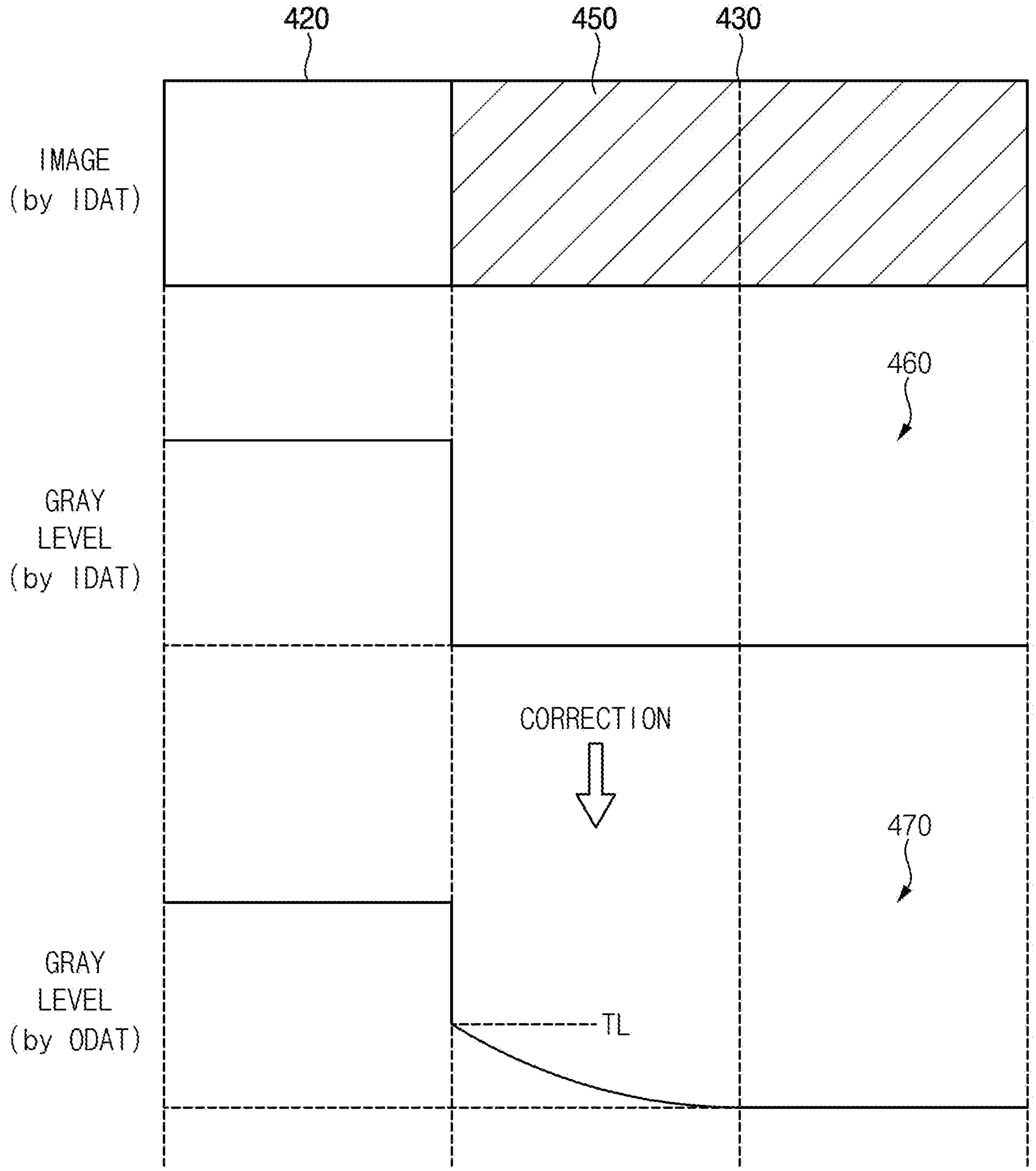
FIG. 10 is a diagram for describing an example where input image data for a light spread region are corrected.
Figure 11:
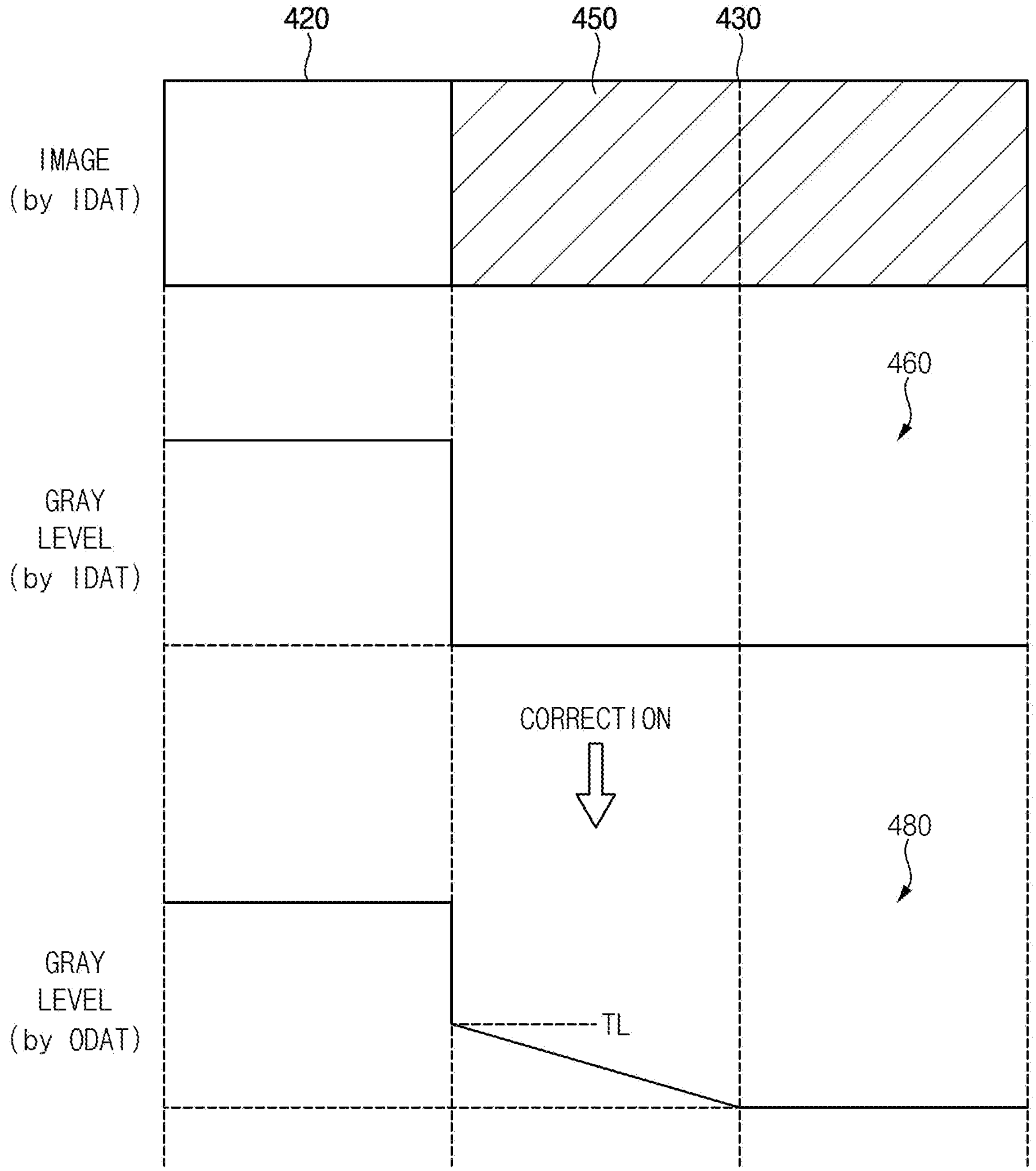
FIG. 11 is a diagram for describing another example where input image data for a light spread region are corrected.

FIG. 7 is a flowchart illustrating a method of operating a display device according to embodiments, FIG. 8 is a diagram for describing an example where a high gray region is detected, FIG. 9 is a diagram for describing an example where a light spread region is set, FIG. 10 is a diagram for describing an example where input image data for a light spread region are corrected, and FIG. 11 is a diagram for describing another example where input image data for a light spread region are corrected.

Referring to FIGS. 6 and 7, in a method of operating a display device according to embodiments, the controller 170*a* of the display device may receive input image data IDAT, and the high gray region detecting block 172 of the controller 170*a* may detect a high gray region adjacent to a low gray region in an image represented by the input image data IDAT (S510).

In some embodiments, as illustrated in FIG. 8, the high gray region detecting block 172 may detect the low gray region 430 having a first gray level GL1 less than or equal to a first reference gray level in the image 410 represented by the input image data IDAT, may detect the high gray region 420 having a second gray level GL2 greater than or equal to a second reference gray level, and may detect an edge between the low gray region 430 and the high gray region 420 where a difference GD between the first gray level GL1 and the second gray level GL2 is greater than or equal to a reference difference. In an example, the first reference gray level may be a 4-gray level, the second reference gray level may be a 120-gray level, and the reference difference may be a 120-gray level. However, the first reference gray level, the second reference gray level and the reference difference are not limited to this example. Further, in some embodiments, the high gray region detecting block 172 may perform an edge detection operation or a low pass filtering operation to detect the edge between the low gray region 430 and the high gray region 420.

The light spread region setting block 174 of the controller 170*a* may set at least a portion of the low gray region 430 adjacent to the high gray region 420 as a light spread region based on a light spread distance LSD and a pixel density PPI of a display panel of the display device (S530).

In some embodiments, as illustrated in FIG. 9, the light spread region setting block 174 may set the light spread region 450 such that the number of pixels (or pixel data PD) included in the light spread region 450 along a width direction (or a direction substantially perpendicular to the high gray region 420) of the light spread region 450 corresponds to a product of the light spread distance LSD and the pixel density PPI. In some embodiments, the light spread distance LSD of the display panel may be determined or measured for each model or lot of the display panel. Further, in some embodiments, the pixel density PPI of the display panel may be pixels per inch, but is not limited thereto.

The light spread region correcting block 176 of the controller 170*a* may generate output image data ODAT by correcting the input image data IDAT for the light spread region 450 (S550).

FIGS. 10 and 11 illustrate an example of gray levels 460 represented by the input image data IDAT, an example of gray levels 470 represented by the output image data ODAT, and another example of gray levels 480 represented by the output image data ODAT. In some embodiments, as illustrated in FIGS. 10 and 11, the light spread region correcting block 176 may determine correction values that gradually decrease along a direction away from the high gray region 420, and may generate the output image data ODAT by adding the correction values to the input image data IDAT for the pixels in the light spread region 450. In some embodiments, as illustrated in FIG. 10, the correction values may non-linearly decrease with respect to a distance from the high gray region 420. In this case, the correction values may rapidly decrease in a region close to the high gray region 420 and slowly decrease in a region farther away from the high gray region 420. Thus, the gray levels 470 represented by the output image data ODAT may non-linearly decrease from a threshold level TL as the distance from the high gray region 420 increases. For example, the threshold level TL may be an 8-gray level, but is not limited thereto. In other embodiments, as illustrated in FIG. 11, the correction values may linearly decrease with respect to the distance from the high gray region 420. Accordingly, the gray levels 480 represented by the output image data ODAT may linearly decrease from the threshold level TL as the distance from the high gray region 420 increases.

The display device may drive the display panel based on the output image data ODAT (S570). For example, a data driver of the display device may provide data voltages corresponding to the output image data ODAT to the display panel. By generating the output image data ODAT that represents higher gray levels for the light spread region 450, which is done by increasing the gray levels represented by the input image data IDAT for the light spread region 450, the pixels in the light spread region 450 may emit light to counter the stress caused by the light emitted by the high gray region 420.

Figure 12:
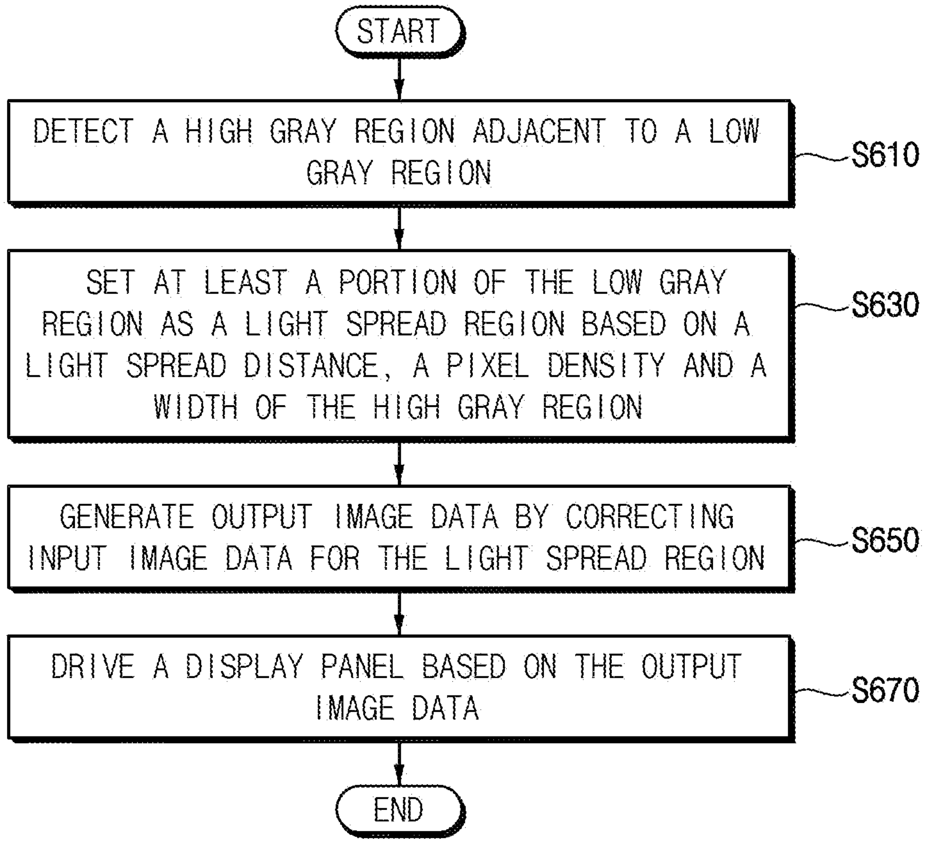
FIG. 12 is a flowchart illustrating a method of operating a display device according to embodiments.
Figure 13:
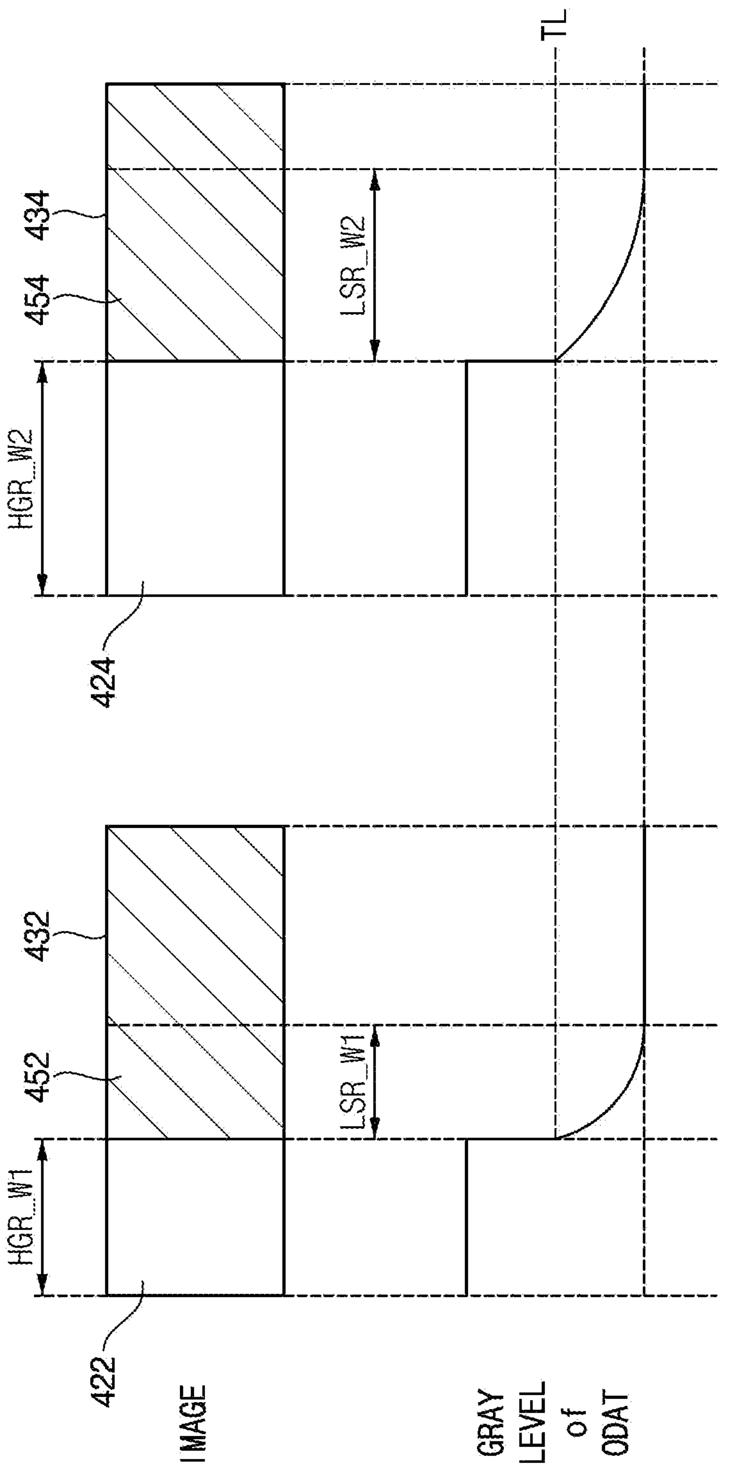
FIG. 13 is a diagram for describing an example where a width of a light spread region is adjusted according to a width of a high gray region.
Figure 14:
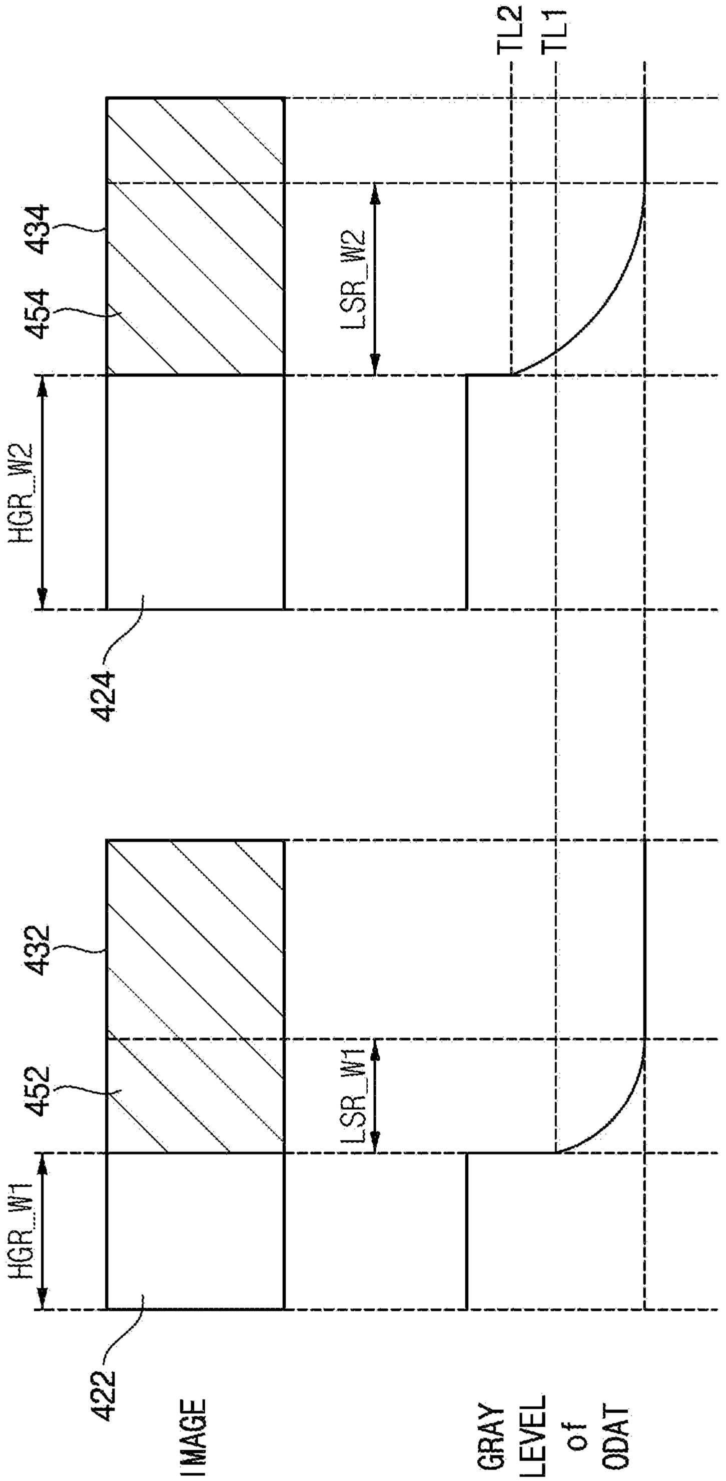
FIG. 14 is a diagram for describing an example where a correction value for a light spread region is adjusted according to a width of a high gray region.

FIG. 12 is a flowchart illustrating a method of operating a display device according to embodiments, FIG. 13 is a diagram for describing an example where a width of a light spread region is adjusted according to a width of a high gray region, and FIG. 14 is a diagram for describing an example where a correction value for a light spread region is adjusted according to a width of a high gray region.

Referring to FIGS. 6 and 12, in a method of operating a display device according to embodiments, the controller 170*a* of the display device may receive input image data IDAT, and the high gray region detecting block 172 of the controller 170*a* may detect a high gray region adjacent to a low gray region in an image represented by the input image data IDAT (S610).

The light spread region setting block 174 of the controller 170*a* may set at least a portion of the low gray region adjacent to the high gray region as a light spread region based on a light spread distance LSD, a pixel density PPI and a width of the high gray region (S630). In some embodiments, the light spread region setting block 174 may set a width of the light spread region as a default width corresponding to a product of the light spread distance LSD and the pixel density PPI. In other words, the light spread region setting block 174 may establish the width of the light spread region to be a default width, which is equivalent to the product of the light spread distance LSD and the pixel density PPI. Further, the light spread region setting block 174 may receive high gray region width information on the width of the high gray region, and may increase the width of the light spread region from the default width as the width of the high gray region increases.

For example, as illustrated in FIG. 13, when a first high gray region 422 has a first width HGR_W1, the light spread region setting block 174 may set a portion of a first low gray region 432 adjacent to the first high gray region 422 as a first light spread region 452 with a second width LSR_W1. Further, when a second high gray region 424 has a third width HGR_W2 greater than the first width HGR_W1, the light spread region setting block 174 may set a portion of a second low gray region 434 adjacent to the second high gray region 424 as a second light spread region 454 with a fourth width LSR_W2 greater than the second width LSR_W1.

The light spread region correcting block 176 of the controller 170*a* may generate output image data ODAT by correcting the input image data IDAT for the light spread regions 452 and 454 (S650). In some embodiments, as illustrated in FIG. 13, the light spread region correcting block 176 may generate the output image data ODAT by correcting the input image data IDAT for the light spread regions 452 and 454 such that gray levels represented by the output image data ODAT with respect to the light spread regions 452 and 454 gradually decrease from a threshold level TL as a distance from the high gray regions 422 and 424 increases. In other example embodiments, as illustrated in FIG. 14, the light spread region correcting block 176 may increase the threshold level TL as the width of the high gray regions 422 and 424 increases. For example, when the first high gray region 422 has the first width HGR_W1, the light spread region correcting block 176 may generate the output image data ODAT for the first light spread region 452 such that gray levels represented by the output image data ODAT for the first light spread region 452 gradually decrease from a first threshold level TL1. Further, when the second high gray region 424 has the third width HGR_W2 greater than the first width HGR_W1, the light spread region correcting block 176 may generate the output image data ODAT for the second light spread region 454 such that gray levels represented by the output image data ODAT for the second light spread region 454 gradually decrease from a second threshold level TL2 higher than the first threshold level TL1.

The display device may drive a display panel based on the output image data ODAT (S670). The output image data ODAT representing heightened levels of gray in the light spread regions 452 and 454 are generated by increasing the gray levels represented in the input image data IDAT for the light spread regions 452 and 454. By doing so, pixels in the light spread regions 452 and 454 can emit light, thereby preventing the stress caused by light emitted by the high gray regions 422 and 424.

Figure 15:
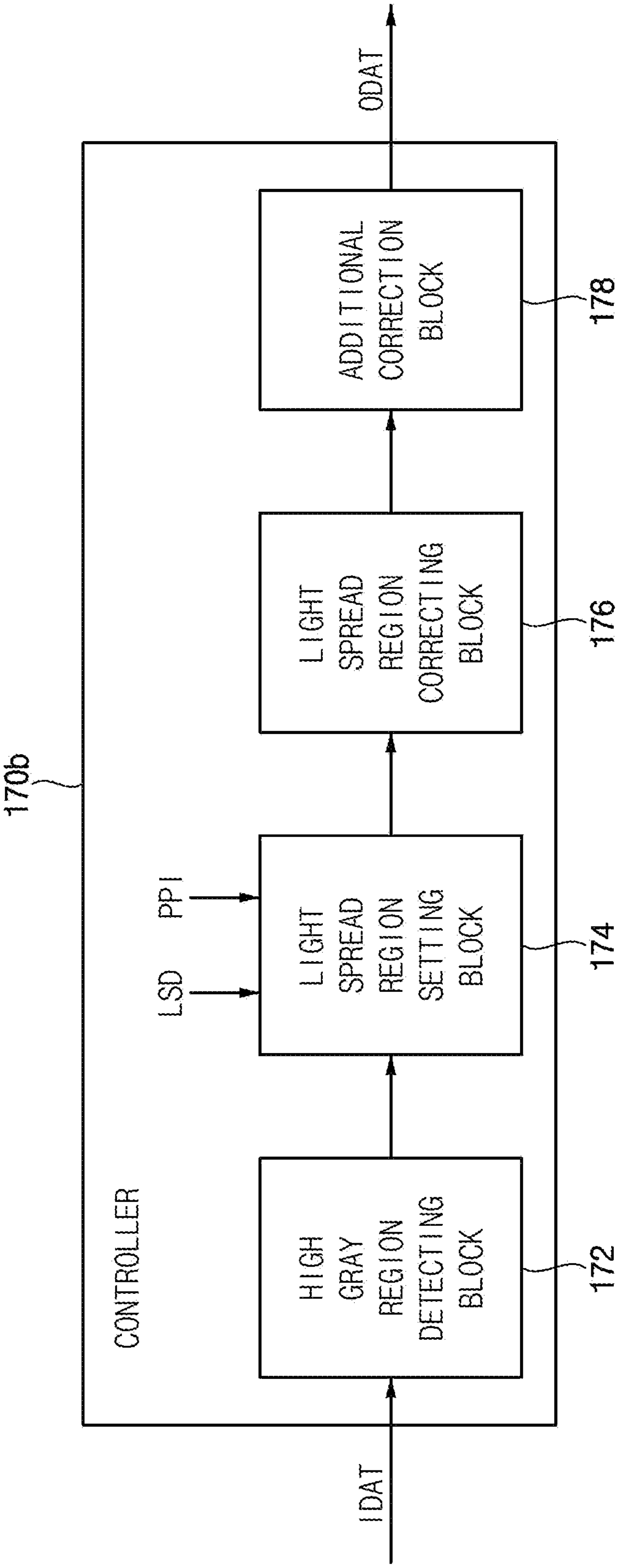
FIG. 15 is a block diagram illustrating a controller included in a display device according to embodiments.

FIG. 15 is a block diagram illustrating a controller included in a display device according to embodiments.

Referring to FIG. 15, a controller 170*b* included in a display device according to embodiments may include a high gray region detecting block 172, a light spread region setting block 174, a light spread region correcting block 176 and an additional correction block 178. The additional correction block 178 may be implemented in hardware as an electronic circuit. The controller 170*b* of FIG. 15 may have a similar configuration and a similar operation to a controller 170*a* of FIG. 6, except that the controller 170*b* may further include the additional correction block 178.

The additional correction block 178 may additionally correct input image data IDAT for a light spread region adjacent to two or more high gray regions. In some embodiments, when a first high gray region and a second high gray region adjacent to the light spread region are detected, the light spread region correcting block 176 may determine a first correction value for preventing light stress caused by the first high gray region and a second correction value for preventing light stress cause by the second high gray region for each pixel included in the light spread region. The additional correction block 178 may then generate output image data ODAT by adding a higher one of the first correction value and the second correction value to the input image data IDAT for each pixel included in the light spread region. In other embodiments, the additional correction block 178 may generate the output image data ODAT by adding a sum of the first correction value and the second correction value to the input image data IDAT for each pixel included in the light spread region.

Figure 16:
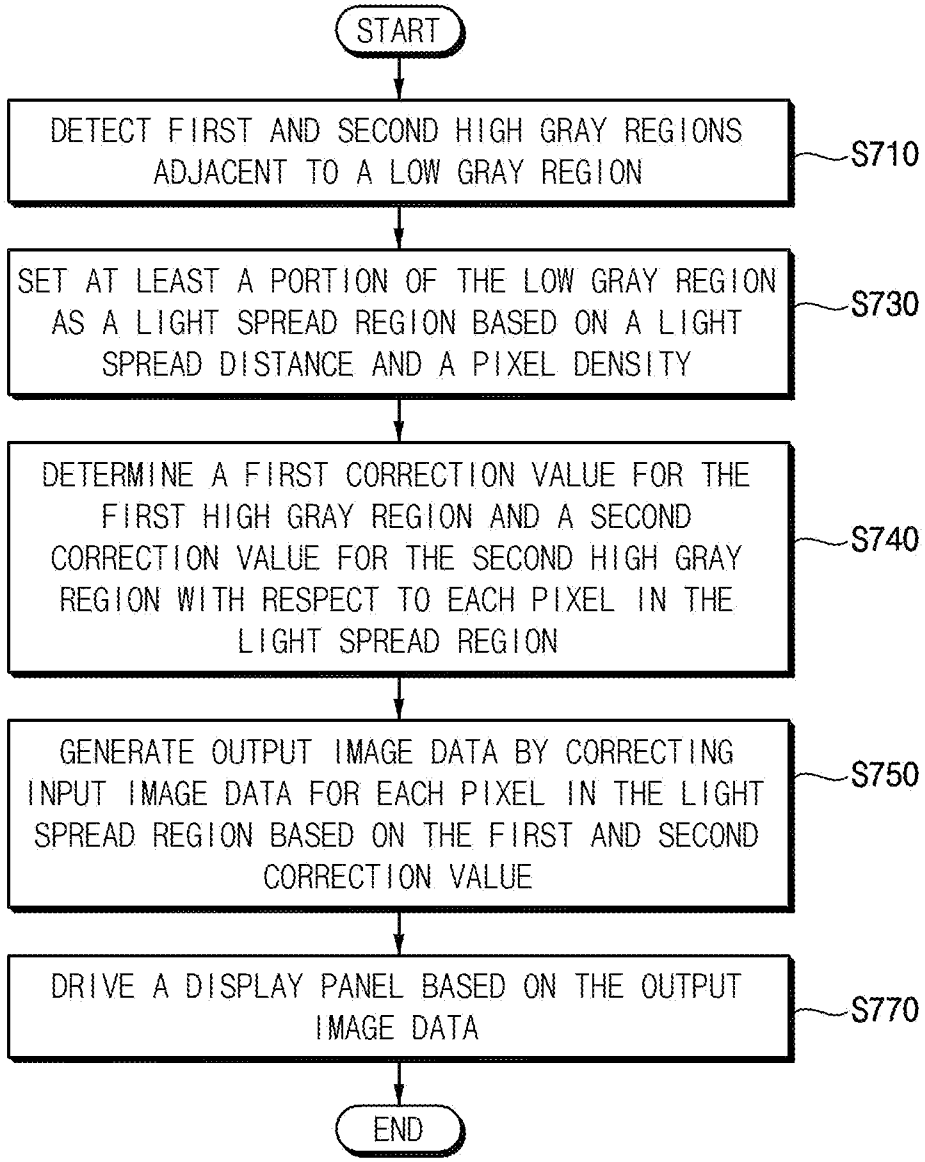
FIG. 16 is a flowchart illustrating a method of operating a display device according to embodiments.
Figure 17:
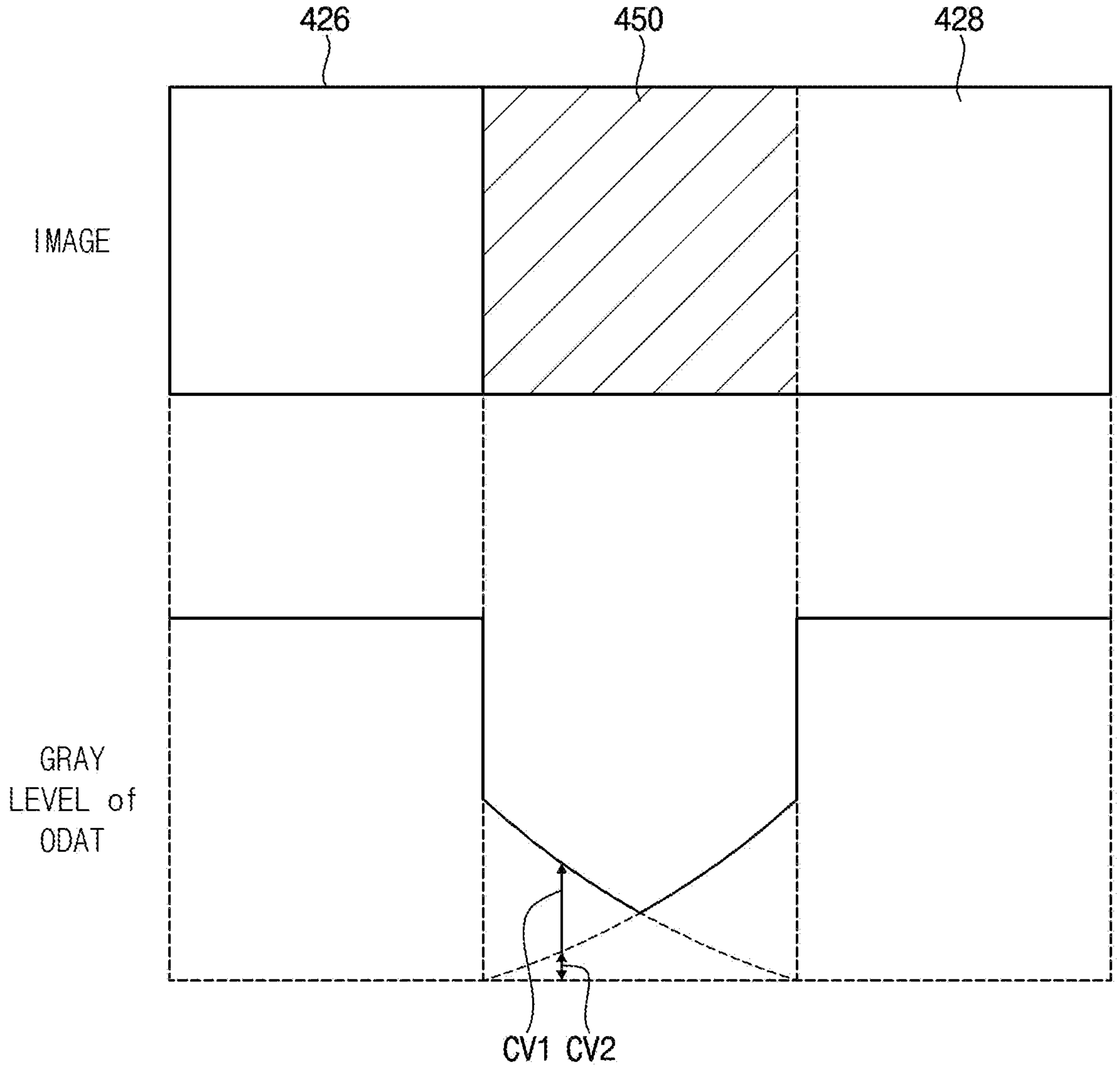
FIG. 17 is a diagram for describing an example where input image data for a light spread region adjacent to two or more high gray regions are corrected.
Figure 18:
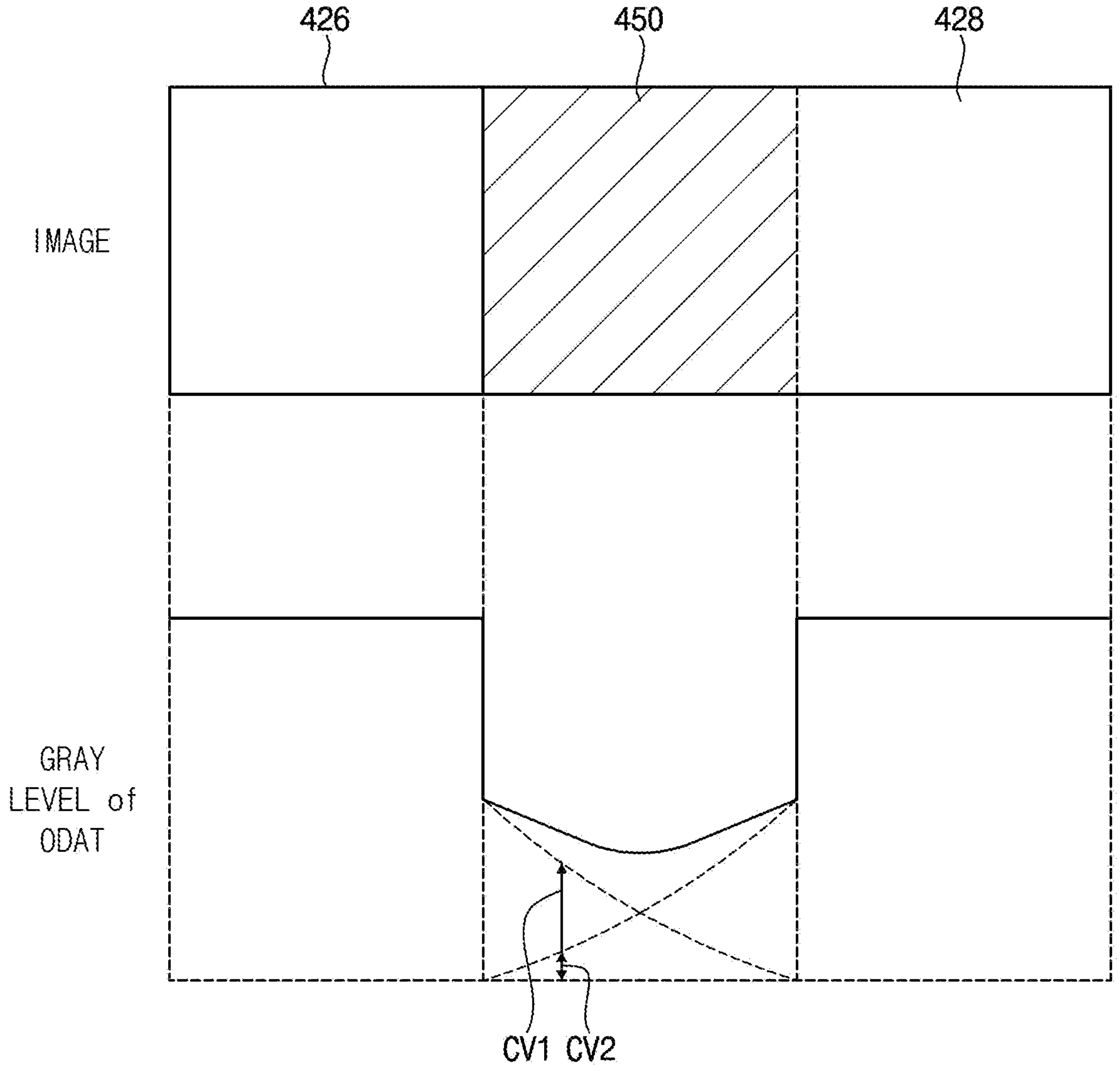
FIG. 18 is a diagram for describing another example where input image data for a light spread region adjacent to two or more high gray regions are corrected.

FIG. 16 is a flowchart illustrating a method of operating a display device according to embodiments, FIG. 17 is a diagram for describing an example where input image data for a light spread region adjacent to two or more high gray regions are corrected, and FIG. 18 is a diagram for describing another example where input image data for a light spread region adjacent to two or more high gray regions are corrected.

Referring to FIGS. 15 and 16, in a method of operating a display device according to embodiments, the controller 170*b* of the display device may receive input image data IDAT, and the high gray region detecting block 172 of the controller 170*b* may detect a first high gray region and a second high gray region adjacent to a low gray region in an image represented by the input image data IDAT (S710).

The light spread region setting block 174 of the controller 170*b* may set at least a portion of the low gray region adjacent to the high gray region as a light spread region based on a light spread distance LSD of a display panel of the display device and a pixel density PPI of the display panel (S730).

For each pixel included in the light spread region, the light spread region correcting block 176 of the controller 170*b* may determine a first correction value for preventing light stress caused by the first high gray region and a second correction value for preventing light stress caused by the second high gray region (S740). The additional correction block 178 of the controller 170*b* may generate output image data ODAT by correcting the input image data IDAT based on the first and second correction values (S750).

In some embodiments, as illustrated in FIG. 17, the light spread region correcting block 176 may determine the first correction value CVl for preventing light stress caused by the first high gray region 426 and the second correction value CV2 for preventing light stress caused by the second high gray region 428 for each pixel included in the light spread region 450. The additional correction block 178 may generate the output image data ODAT by adding a higher one of the first correction value CV1 and the second correction value CV2 to the input image data IDAT for each pixel included in the light spread region 450. In other embodiments, as illustrated in FIG. 18, the additional correction block 178 may generate the output image data ODAT by adding a sum of the first correction value CV1 and the second correction value CV2 to the input image data IDAT for each pixel included in the light spread region 450.

The display device may drive the display panel based on the output image data ODAT (S770). Since the output image data ODAT representing increased gray levels with respect to the light spread region 450 are generated by increasing gray levels represented by the input image data IDAT for the light spread region 450, pixels in the light spread region 450 may emit light to prevent stress caused by light emitted by the high gray regions 426 and 428.

Figure 19:
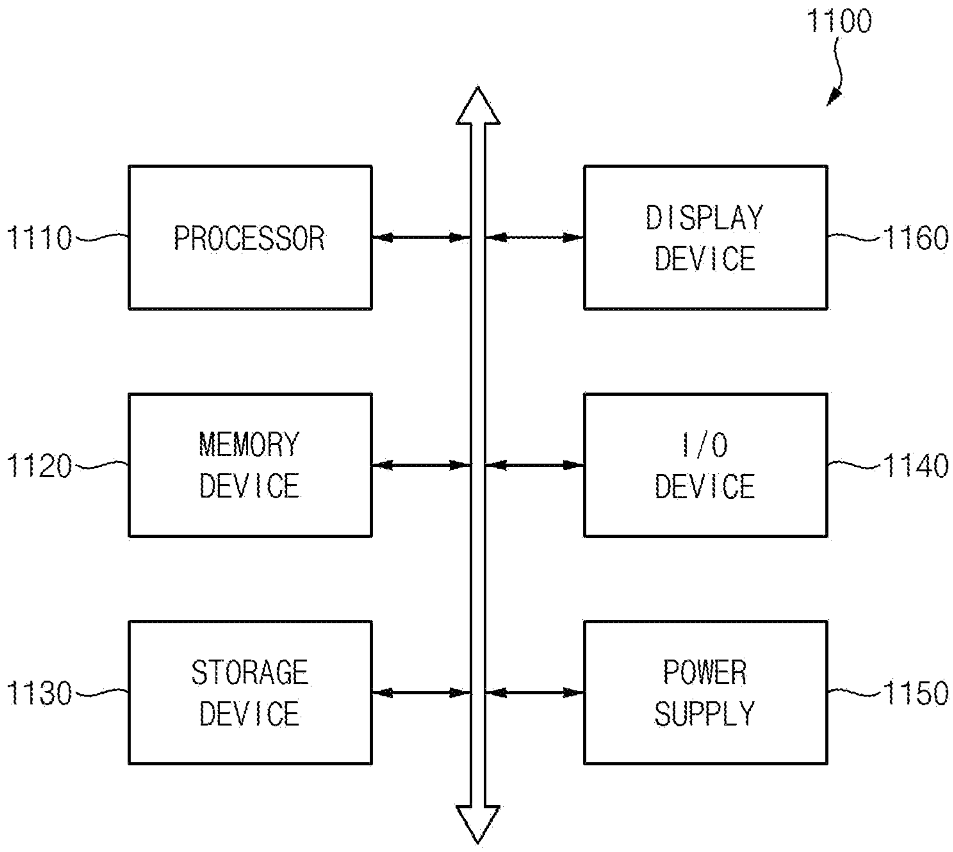
FIG. 19 is a block diagram illustrating an electronic device including a display device according to embodiments.

FIG. 19 is a block diagram illustrating an electronic device including a display device according to embodiments.

Referring to FIG. 19, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components via the buses or other communication links.

The display device 1160 can detect a high gray region adjacent to a low gray region, and based on a pixel density of a display panel and a light spread distance, set at least a portion of the low gray region may be set as a light spread, and correct image data for the light spread region. Accordingly, light stress to pixels in the light spread region caused by light emitted by the high gray region may be prevented.

According to embodiments, the electronic device 1100 may be any electronic device including the display device 1160, such as a digital television, a 3D television, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

Figure 20:
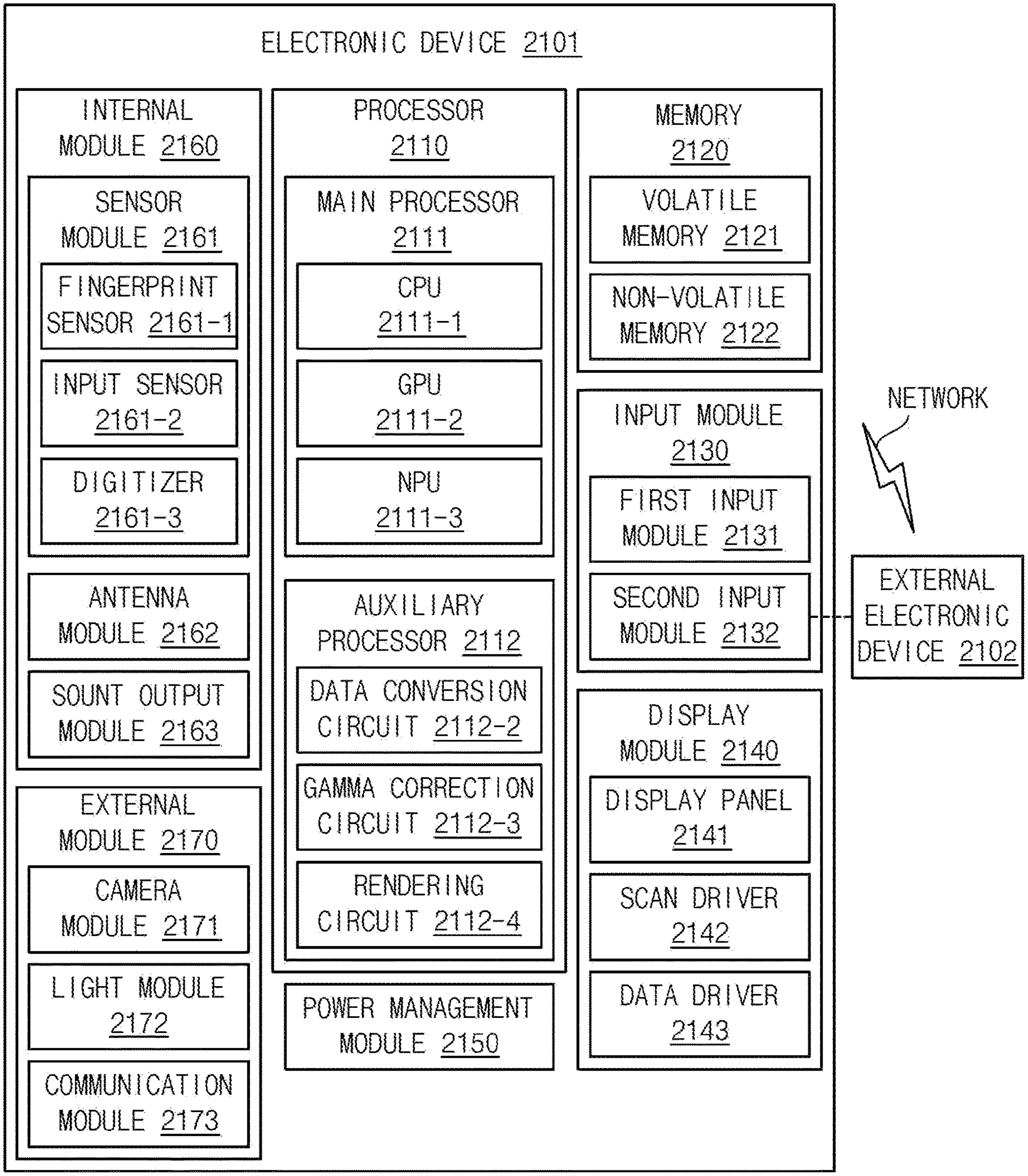
FIG. 20 is a block diagram illustrating an example of an electronic device according to embodiments.

FIG. 20 is a block diagram illustrating an example of an electronic device according to embodiments.

An electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As still another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component, or one component may be provided separately as two or more components.

Referring to FIG. 20, the electronic device 2101 may communicate with an external electronic device 2102 via a network (e.g., a short-range wireless communication network or a long-range wireless communication network). In some embodiments, the electronic device 2101 may include the processor 2110, the memory 2120, the input module 2130, the display module 2140, a power management module 2150, an internal module 2160 and an external module 2170. In some embodiments, at least one of the components may be omitted from the electronic device 2101, or one or more other components may be added in the electronic device 2101. In some embodiments, some of the components (e.g., the sensor module 2161, an antenna module 2162, or the sound output module 2163) may be implemented as a single component (e.g., the display module 2140).

The processor 2110 may execute software to control at least one other component (e.g., a hardware or software component) of the electronic device 2101 coupled with the processor 2110, and may perform various data processing or computation. According to some embodiments, as at least part of the data processing or computation, the processor

2110 may store a command or data received from another component (e.g., the input module 2130, the sensor module 2161 or a communication module 2173) in volatile memory 2121, may process the command or the data stored in the volatile memory 2121, and may store resulting data in non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP), and an image signal processor (ISP). The main processor 2111 may further include a neural processing unit (NPU) 2111-3. The NPU 2111-3 may be a processor specialized in processing an artificial intelligence model, and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip), or respective processing units and processors may be implemented as independent components (e.g., a plurality of chips).

The auxiliary processor 2112 may include a controller. The controller may include an interface conversion circuit and a timing control circuit. The controller may receive an image signal from the main processor 2111, may convert a data format of the image signal to meet interface specifications with the display module 2140, and may output image data. The controller may output various control signals required for driving the display module 2140.

The auxiliary processor 2112 may further include a data conversion circuit 2112-2, a gamma correction circuit 2112-3, a rendering circuit 2112-4, or the like. The data conversion circuit 2112-2 may receive image data from the controller. The data conversion circuit 2112-2 may compensate for the image data such that an image is displayed with a desired luminance according to characteristics of the electronic device 2101 or the user's setting, or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161, or the sound output module 2163) of the electronic device 2101 from the outside of the electronic device 2101 (e.g., the user or the external electronic device 2102).

The input module 2130 may include a first input module 2131 for receiving a command or data from the user, and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In some embodiments, the second input module 2132 may include a high definition multimedia interface (HDMI), a universal serial bus (USB) interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is limited thereto. The display panel 2141 may be a rigid type display panel, or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit (ASG), a low temperature polycrystalline silicon (LTPS) TFT gate driver circuit or an oxide semiconductor TFT gate driver circuit (OSG) embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142, or may be integrated into the scan driver 2142.

The data driver 2143 may receive a control signal from the controller, may convert image data into analog voltages (e.g., data voltages) in response to the control signal, and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include the emission driver, a voltage generator circuit, or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable, or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131, and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen, or may transmit/receive data to/from the active pen.

The input sensor 2161-2 may measure a bio-signal, such as blood pressure, moisture or body fat. For example, when a portion of the body of the user touches a sensor layer or a sensing panel, and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, or may transmit/receive data to/from the active pen.

At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141, or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In some embodiments, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements (e.g., light emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The antenna module 2162 may include one or more antennas for transmitting or receiving a signal or power to or from the outside. In some embodiments, the communication module 2173 may transmit or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In some embodiments, the receiver may be implemented as separate from, or as part of the speaker. A sound output pattern of the sound output module 2163 may be integrated into the display module 2140.

The camera module 2171 may capture a still image and a moving image. In some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171, or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system (GNSS) communication module) or a wired communication module (e.g., a local area network (LAN) communication module or a power line communication (PLC) module). The communication module 2173 may communicate with the external electronic device 2102 via a short-range communication network (e.g., Bluetooth™, wireless-fidelity (Wi-Fi) direct, or infrared data association (IrDA)) or a long-range communication network (e.g., a cellular network, the Internet or a computer network (e.g., LAN or wide area network (WAN)). These various types of communication modules 2173 may be implemented as a single chip, or may be implemented as multi-chips separate from each other.

The input module 2130, the sensor module 2161, the camera module 2171, and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen, and may output the image data to the display module 2140. Alternatively, the processor 2110 may generate command data corresponding to the input data, and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120, and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161, and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data, and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI) or ultra-path interconnect (UPI)). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. For example, the electronic device 2101 may include at least one of a portable communication device (e.g., a smart phone), a computer device, a portable multimedia device, a portable medical device, a camera, a wearable device and a home appliance. However, the electronic device 2101 according to embodiments is not limited to the above-described devices.

The foregoing is illustrative of embodiments and is not to be construed as limiting thereof. Although a few embodiments have been described, those skilled in the art will readily appreciate that many modifications are possible in the embodiments without departing from the teachings of the present inventive concept. Accordingly, all such modifications are intended to be included within the scope of the present inventive concept as set forth in the claims.

What is claimed is:

1. A display device comprising:

a display panel including pixels;

a controller configured to receive input image data, to detect a high gray region adjacent to a low gray region in an image represented by the input image data, to set at least a portion of the low gray region adjacent to the high gray region as a light spread region based on a light spread distance er and a pixel density of the display panel, and to generate output image data by correcting the input image data for the light spread region; and a data driver configured to provide data voltages to the pixels based on the output image data, wherein the controller includes:

a high gray region detecting circuit configured to detect the high gray re adjacent to the low gray region in the image represented by the input image data:

a light spread region setting circuit configured to set at least the portion of the low ray region adjacent to the high gray reg light spread region based on the light spread distance and the pixel density of the display panel: and a light spread region correcting circuit configured to correct the input image data for the light spread region.

2. The display device of claim 1, wherein the image in the low gray region has a gray level lower than or equal to a first reference gray level, and the image in the high gray region has a gray level greater than or equal to a second reference gray level.

3. The display device of claim 1, wherein the controller sets the light spread region such that a number of the pixels included in the light spread region along a width direction of the light spread region corresponds to a product of the light spread distance and the pixel density.

4. The display device of claim 1, wherein the controller generates the output image data by increasing the input image data for the light spread region.

5. The display device of claim 1, wherein the pixels in the light spread region emit light to prevent stress caused by light emitted by the high gray region.

6. The display device of claim 1, wherein the high gray region detecting circuit detects the high gray region adjacent to the low gray region by detecting an edge between the low gray region and the high gray region.

7. The display device of claim 1, wherein the light spread region setting circuit receives light spread distance information on the light spread distance of the display panel and pixel density information on the pixel density of the display panel, determines a number of the pixels by multiplying the light spread distance provided in the light spread distance information and the pixel density provided in the pixel density information, and sets the light spread region such that the light spread region includes the number of the pixels along a width direction of the light spread region.

8. The display device of claim 7, wherein the light spread region setting circuit further receives high gray region width information indicating a width of the high gray region, and increases a width of the light spread region as the width of the high gray region increases.

9. The display device of claim 1, wherein the light spread region correcting circuit determines correction values that gradually decrease along a direction away from the high gray region, and generates the output image data by adding the correction values to the input image data for the pixels in the light spread region.

10. The display device of claim 9, wherein the correction values non- linearly decrease with respect to a distance from the high gray region such that the correction values decrease rapidly in a region close to the high gray region and decrease slowly in a region far from the high gray region.

11. The display device of claim 9, wherein the correction values linearly decrease with respect to a distance from the high gray region.

12. The display device of claim 1, wherein the controller further includes:

an additional correction circuit configured to additionally correct the input image data for the light spread region adjacent to two or more high gray regions.

13. The display device of claim 12, wherein, when a first high gray region and a second high gray region adjacent to the light spread region are detected, the light spread region correcting circuit determines a first correction value for preventing light stress caused by the first high gray region and a second correction value for preventing light stress caused by the second high gray region with respect to each of the pixels included in the light spread region, and the additional correction circuit generates the output image data by adding a higher one of the first correction value and the second correction value to the input image data with respect to each of the pixels included in the light spread region.

14. The display device of claim 12, wherein, when a first high gray region and a second high gray region adjacent to the light spread region are detected, the light spread region correcting circuit determines a first correction value for preventing light stress caused by the first high gray region and a second correction value for preventing light stress caused by the second high gray region with respect to each of the pixels included in the light spread region, and the additional correction circuit generates the output image data by adding a sum of the first correction value and the second correction value to the input image data with respect to each of the pixels included in the light spread region.

15. A method of operating a display device, the method comprising:

detecting a high gray region adjacent to a low gray region in an image represented by input image data;

setting at least a portion of the low gray region adjacent to the high gray region as a light spread region based on a light spread distance er and a pixel density of a display panel of the display device;

generating output image data by correcting the input image data for the light spread region; and driving the display panel based on the output image data, wherein setting at least the portion of the low gra djacent to the high ion a e light spread region comprises:

determining a number of p els along a width direction of the light spread region by multiplying the light spread distance and the pixel density; and setting the light spread region such that the light spread region includes the number of the pixels along the width direction of the light spread region.

16. The method of claim 15, wherein a width of the light spread region increases as a width of the high gray region increases.

17. The method of claim 15, wherein generating the output image data includes:

determining correction values that decrease along a direction away from the high gray region; and generating the output image data by adding the correction values to the input image data for the pixels in the light spread region.

18. The method of claim 15, further comprising:

additionally correcting the input image data for the light spread region adjacent to two or more high gray regions.

19. A display driver that drives a display panel, the display driver comprising:

a controller configured to receive input image data for the display panel, to detect a high gray region adjacent to a low gray region in an image represented by the input image data, to set a portion of the low gray region adjacent to the high gray region as a light spread region based on a light spread distance er and a pixel density of the display panel, and to generate output image data by correcting the input image data for the light spread region; and a data driver configured to provide data voltages to pixels of the display panel based on the output image data, wherein the controller includes:

high gray region detecting circuit configured to det ect the hi aray region adjacent to the low gray region in the image represented by the input image data:

a light spread region setting circuit configured to set at least the portion of the low gray region adjacent to the high gray region as the light spread region based on the light spread distance and the pixel density of the display panel; and a light spread region correcting circuit configured to correct the input image data for the light spread region.

* * * * *